(12) United States Patent
Cohn et al.

(10) Patent No.: US 9,749,181 B2
(45) Date of Patent: Aug. 29, 2017

(54) MANAGING COMMUNICATIONS FOR MODIFIED COMPUTER NETWORKS

(71) Applicant: Amazon Technologies, Inc., Reno, NV (US)

(72) Inventors: Daniel T. Cohn, Seattle, WA (US); Eric Jason Brandwine, Haymarket, VA (US); Andrew J. Doane, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/599,182

(22) Filed: Jan. 16, 2015

(65) Prior Publication Data

US 2015/0134791 A1    May 14, 2015

Related U.S. Application Data

(63) Continuation of application No. 14/265,159, filed on Apr. 29, 2014, now Pat. No. 8,937,960, which is a
(Continued)

(51) Int. Cl.
*H04L 12/58* (2006.01)
*H04L 12/24* (2006.01)
(Continued)

(52) U.S. Cl.
CPC ...... *H04L 41/0816* (2013.01); *G06F 9/45533* (2013.01); *H04L 41/50* (2013.01);
(Continued)

(58) Field of Classification Search
CPC .......................... H04L 4/0816; G06F 9/45533
(Continued)

(56) References Cited

U.S. PATENT DOCUMENTS

2005/0268298 A1* 12/2005 Hunt ............... G06F 9/4856
                                                             718/1
2007/0061441 A1   3/2007 Landis et al.
(Continued)

OTHER PUBLICATIONS

"Anycast," retrieved on Mar. 16, 2009, from http://en.wikipedia.org/wiki/Anycast, 4 pages.
(Continued)

*Primary Examiner* — Ricky Ngo
*Assistant Examiner* — Wei-Po Kao
(74) *Attorney, Agent, or Firm* — Seed IP Law Group LLP

(57) ABSTRACT

Techniques are described for managing communications between multiple computing nodes, such as computing nodes that are part of a virtual computer network. In some situations, various types of modifications may be made to one or more computing nodes of an existing virtual computer network, and the described techniques include managing ongoing communications for those computing nodes so as to accommodate the modifications. Such modifications may include, for example, migrating or otherwise moving a particular computing node that is part of a virtual network to a new physical network location, or modifying other aspects of how the computing node participates in the virtual network (e.g., changing one or more virtual network addresses used by the computing node). In some situations, the computing nodes may include virtual machine nodes hosted on one or more physical computing machines or systems, such as by or on behalf of one or more users.

22 Claims, 10 Drawing Sheets

Related U.S. Application Data continuation of application No. 13/472,144, filed on May 15, 2012, now Pat. No. 8,737,408, which is a continuation of application No. 12/402,331, filed on Mar. 11, 2009, now Pat. No. 8,194,680.

(51) Int. Cl.

| | | |
|---|---|---|
| *H04L 29/12* | (2006.01) | |
| *H04L 29/06* | (2006.01) | |
| *G06F 9/455* | (2006.01) | |
| *H04W 4/02* | (2009.01) | |
| *H04W 80/04* | (2009.01) | |

(52) U.S. Cl.
CPC .......... *H04L 61/103* (2013.01); *H04L 61/251* (2013.01); *H04L 69/167* (2013.01); *H04W 4/02* (2013.01); *H04W 80/045* (2013.01)

(58) Field of Classification Search
USPC ....... 370/352, 353, 354, 389, 392, 393, 396, 370/397, 398, 399, 401, 474, 475, 492, 370/501
See application file for complete search history.

(56) References Cited

U.S. PATENT DOCUMENTS

| | | |
|---|---|---|
| 2007/0280243 A1 | 12/2007 | Wray et al. |
| 2008/0186990 A1 | 8/2008 | Abali et al. |
| 2008/0186992 A1 | 8/2008 | Kondapalli et al. |
| 2008/0225875 A1 | 9/2008 | Wray et al. |
| 2008/0240122 A1 | 10/2008 | Richardson et al. |
| 2009/0003353 A1 | 1/2009 | Ding et al. |
| 2009/0046733 A1 | 2/2009 | Bueno et al. |
| 2009/0182928 A1 | 7/2009 | Becker et al. |
| 2009/0198817 A1* | 8/2009 | Sundaram ......... H04L 29/12301 709/227 |
| 2009/0288084 A1* | 11/2009 | Astete ................. G06F 9/45533 718/1 |
| 2009/0296726 A1 | 12/2009 | Snively et al. |
| 2010/0107162 A1 | 4/2010 | Edwards et al. |
| 2010/0180014 A1* | 7/2010 | Kannan ............. H04L 29/12216 709/220 |
| 2010/0180275 A1 | 7/2010 | Neogi et al. |
| 2016/0019085 A1* | 1/2016 | Khandekar ......... G06F 9/45558 718/1 |

OTHER PUBLICATIONS

"Load Balancing (Computing)," retrieved on Mar. 16, 2009, from http://en.wikipedia.org/wiki/Load_balancing_(computing), 5 pages.
"Mobile IP," retrieved on Dec. 19, 2008, from http://en.wikipedia.org/wiki/Mobile_ip, 3 pages.
"Round Robin DNS," retrieved on Dec. 17, 2008, from http://en.wikipedia.org/wiki/Round_robin_DNS, 2 pages.
"Virtual IP Address," retrieved on Dec. 17, 2008, from http://www.answers.com/topic/virtual-ip-address-1, 2 pages.
"VMware VMotion," retrieved on Mar. 16, 2009, from http://www.vmware.com/products/vi/vc/vmotion.html, 2 pages.
"VMware Storage VMotion," retrieved on Mar. 16, 2009, from http://www.vmware.com/products/vi/storage_vmotion.html, 2 pages.
Clark, C., et al., "Live Migration of Virtual Machines," retrieved on Mar. 16, 2009, from http://www.cl.cam.ac.uk/research/srg/netos/papers/2005-migration-nsdi-pre.pdf, 14 pages.

* cited by examiner

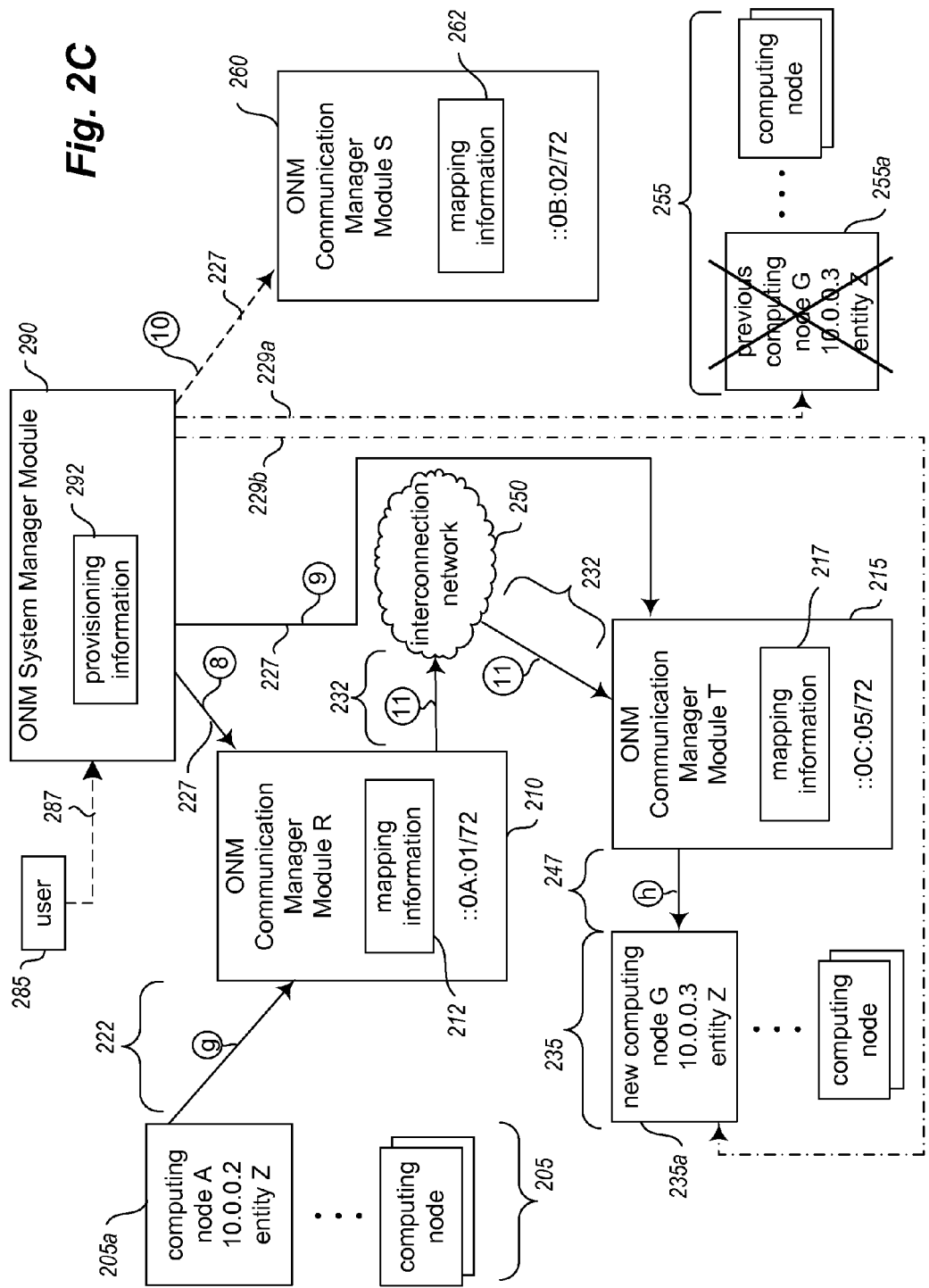

MANAGING COMMUNICATIONS FOR MODIFIED COMPUTER NETWORKS

CROSS-REFERENCE TO RELATED APPLICATIONS

This application is a continuation of co-pending U.S. patent application Ser. No. 14/265,159, filed Apr. 29, 2014, and entitled "Managing Communications for Modified Computer Networks," which is hereby incorporated by reference in its entirety. U.S. patent application Ser. No. 14/265,159 is a continuation of U.S. patent application Ser. No. 13/472,144, filed May 15, 2012, and entitled "Managing Communications for Modified Computer Networks," now U.S. Pat. No. 8,737,408, which is hereby incorporated by reference in its entirety. U.S. patent application Ser. No. 13/472,144 is a continuation of U.S. patent application Ser. No. 12/402,331, filed Mar. 11, 2009 and entitled "Managing Communications for Modified Computer Networks," now U.S. Pat. No. 8,194,680, which is hereby incorporated by reference in its entirety.

BACKGROUND

Many companies and other organizations operate computer networks that interconnect numerous computing systems to support their operations, with the computing systems alternatively co-located (e.g., as part of a private local network) or instead located in multiple distinct geographical locations (e.g., connected via one or more private or shared intermediate networks). For example, data centers housing significant numbers of interconnected computing systems have become commonplace, such as private data centers that are operated by and on behalf of a single organization, as well as public data centers that are operated by entities as businesses. Some public data center operators provide network access, power, and secure installation facilities for hardware owned by various customers, while other public data center operators provide "full service" facilities that also include hardware resources made available for use by their customers. However, as the scale and scope of typical data centers and computer networks has increased, the task of provisioning, administering, and managing the associated physical computing resources has become increasingly complicated.

The advent of virtualization technologies for commodity hardware has provided some benefits with respect to managing large-scale computing resources for many customers with diverse needs, allowing various computing resources to be efficiently and securely shared between multiple customers. For example, virtualization technologies such as those provided by VMWare, XEN, or User-Mode Linux may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span one or more physical resources, such as a single virtual machine with multiple virtual processors that actually spans multiple distinct physical computing systems.

BRIEF DESCRIPTION OF THE DRAWINGS

FIGS. 2A-2C illustrate examples of managing communications between computing nodes that occur via an overlay network.

DETAILED DESCRIPTION

Figure 1:
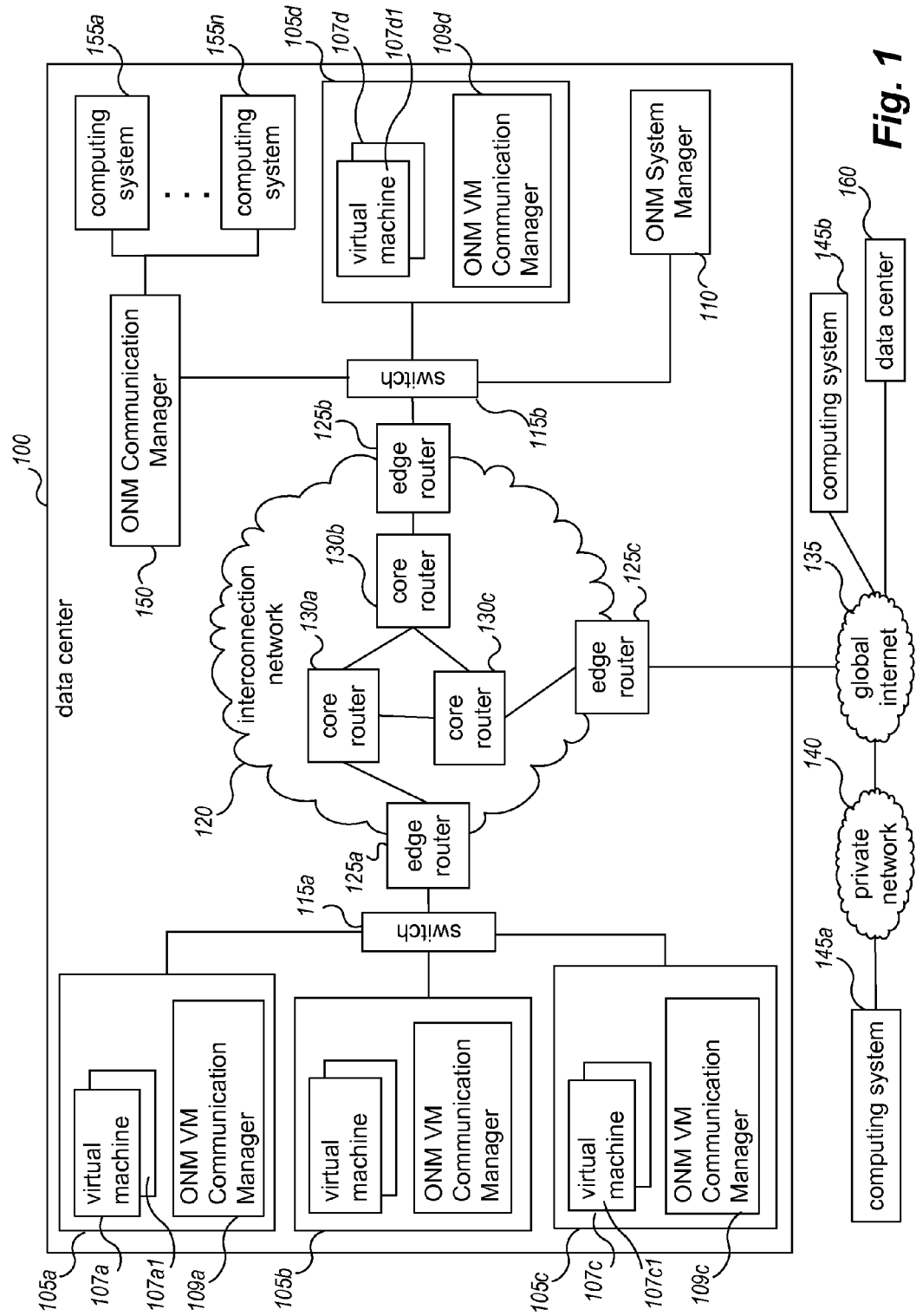
FIG. 1 is a network diagram illustrating an example embodiment of configuring communications between computing nodes belonging to a virtual network.

Techniques are described for managing communications between multiple computing nodes, such as for multiple computing nodes that are part of a virtual computer network. In at least some embodiments, various types of modifications may be made to one or more computing nodes of an existing virtual computer network, and the described techniques include managing ongoing communications for those computing nodes so as to accommodate the modifications. Such modifications may include, for example, migrating or otherwise moving a particular computing node that is part of a virtual network to a new physical network location, or modifying other aspects of how the computing node participates in the virtual network (e.g., changing one or more virtual network addresses used by the computing node), and the corresponding management of the communications may include tracking and updating information used to direct communications to and from such a computing node in various manners, as described in greater detail below. In at least some embodiments, some or all of the described techniques are automatically performed by embodiments of an Overlay Network Manager system.

A virtual local network or other virtual computer network between multiple computing nodes may be provided in various ways in various embodiments, such as by creating an overlay network using one or more intermediate physical networks that separate the multiple computing nodes. In such embodiments, the intermediate physical network(s) may be used as a substrate network on which the overlay virtual network is provided, with messages between computing nodes of the overlay virtual network being passed over the intermediate physical network(s), but with the computing nodes being unaware of the existence and use of the intermediate physical network(s) in at least some such embodiments. For example, the multiple computing nodes may each have a distinct physical substrate network address that corresponds to a location of the computing node within the intermediate physical network(s), such as a substrate IP ("Internet Protocol") network address (e.g., an IP network address that is specified in accordance with IPv4, or "Internet Protocol version 4," or in accordance with IPv6, or "Internet Protocol version 6," such as to reflect the networking protocol used by the intermediate physical networks). In other embodiments, a substrate network on which a virtual computer network is overlaid may itself include or be composed of one or more other virtual computer networks, such as other virtual computer networks implemented by one or more third parties (e.g., by an operator or provider of Internet or telecom infrastructure). When computing nodes are selected to participate in a virtual computer network being provided by the Overlay Network Manager system and being overlaid on a substrate network, each computing node may be assigned one or more virtual network addresses for the provided virtual computer network that are unrelated to those computing nodes' substrate network addresses, such as from a range of virtual network addresses used for the provided virtual computer network—in at least some embodiments and situations, the virtual computer network being provided may further use a networking protocol that is different from the networking protocol used by the substrate network (e.g., with the virtual network using the IPv4 networking protocol, and the substrate network using the IPv6 networking protocol). The computing nodes of the virtual network inter-communicate using the virtual network addresses (e.g., by sending a communication to another computing node by specifying that other computing node's virtual network address as the destination network address for the communication), but the substrate network may be configured to route communications based on substrate network addresses. If so, the overlay virtual network may be implemented from the edge of the intermediate physical network(s), by modifying the communications that enter the intermediate physical network(s) to use substrate network addresses that are based on the networking protocol of the substrate network, and by modifying the communications that leave the intermediate physical network(s) to use virtual network addresses that are based on the networking protocol of the virtual network. Additional details related to the provision of such an overlay virtual network are included below.

In at least some embodiments, an embodiment of an Overlay Network Manager ("ONM") system provides overlay virtual networks to customers and other users, such as by providing and using numerous computing nodes that are in one or more geographical locations (e.g., in one or more data centers) and that are inter-connected via one or more intermediate physical networks. The ONM system may use various communication manager modules at the edge of the one or more intermediate physical networks to manage communications for the various overlay virtual networks as they enter and leave the intermediate physical network(s), and may use one or more system manager modules to coordinate other operations of the ONM system. For example, to enable the communication manager modules to manage communications for the overlay virtual networks being provided, the ONM system may track and use various information about the computing nodes of each virtual network, such as to map the substrate physical network address of each such computing node to the one or more overlay virtual network addresses associated with the computing node. Such mapping and other information may be stored and propagated in various manners in various embodiments, including centrally or in a distributed manner, as discussed in greater detail below.

As previously noted, various types of modifications to computing nodes of an existing overlay virtual network may be supported by the ONM system in at least some embodiments, with the ONM system performing various actions to support such modifications. For example, the described techniques may be used in some embodiments to allow computing nodes of an overlay virtual network to be physically moved or otherwise positioned as desired, with the substrate physical network addresses of such moved computing nodes changing while their associated virtual network addresses may remain constant. Such movement of a computing node of an overlay virtual network may be managed by configuring the overlay network to route communications for a particular virtual network address assigned to the computing node to a current corresponding actual physical substrate network address for the computing node (e.g., by updating mappings that associate particular virtual network addresses of particular virtual networks to particular substrate network addresses or other indications of physical locations of the computing nodes to which those virtual network addresses are assigned). As one example, a computing node of a virtual network may be physically moved between distinct physical networks supported by distinct networking layer 3 routers (e.g., in different geographical locations, such as from one data center at one geographical location to a different data center at another geographical location), or between distinct physical sub-networks supported by distinct networking layer 2 switches (e.g., in different geographical locations, such as from one data center at one geographical location to a different data center at another geographical location), as described in greater detail below. In some embodiments and situations, the movement of such a computing node may involve the physical moving of a physical hardware host computing system that supports the computing node, but in other embodiments such a computing node may be moved by migrating or otherwise moving some or all of the software executing on the computing node and/or the data used by the executing software to a new physical hardware host computing system in a different network location, with the new physical hardware host computing system providing the same logical computing node after the move is completed.

In addition, types of modifications of an existing overlay virtual network other than moving computing nodes may be supported by the ONM system in at least some embodiments. For example, rather than modifying the substrate network address associated with a particular computing node of a virtual network, one or more virtual network addresses associated with the computing node may be modified in some circumstances, and the ONM system may similarly update the mappings that it uses to associate particular virtual network addresses of particular virtual networks to particular substrate network addresses to correspond to those modifications. As one example, a particular computing node may specify that its virtual network address is to be modified, such as by notifying the ONM system of the new virtual network address to be used (e.g., by using an API, or application programming interface, provided by the ONM system for that purpose; by a user associated with the ONM system using a GUI, or graphical user interface, provided by the ONM system for that purpose; etc.). Alternatively, the particular computing node may modify the virtual network address that it is using for itself without explicitly notifying the ONM system, and the ONM system may automatically detect the new virtual network address that is being used (e.g., by monitoring communications sent from the computing node to identify the new virtual network address; by receiving an indication of the new virtual network address when another computing node attempts to use it and in response performing a broadcast request to identify whatever computing node is using the new virtual network address; etc.). In addition, rather than modifying an executing virtual network address that is already in use, the computing node may create or otherwise initiate use of a new additional virtual network address (e.g., as part of a new interface to the computing node that is created), and may or may not notify the ONM system of the new additional virtual network address in the manners previously described. Additional details related to updating and using mapping information to manage communications are included below.

In at least some embodiments, the computing nodes between which communications are configured may be physical computing systems and/or may be virtual machines that are each hosted on one or more physical computing systems, and the communications may include transmissions of data (e.g., messages, packets, frames, streams, etc.) in various formats. As previously noted, some or all computing nodes used for a particular provided overlay virtual network may in some embodiments be provided by the ONM system for use by users, while in other embodiments some or all such computing nodes may instead be provided by a user who uses those computing nodes. Furthermore, in at least some situations, an embodiment of the ONM system may be part of or otherwise affiliated with a program execution service (or "PES") that executes multiple programs on behalf of multiple customers or other users of the service, such as a program execution service that uses multiple computing systems on multiple physical networks (e.g., multiple physical computing systems and networks within a data center). In at least some such embodiments, virtual networks to which computing nodes belong may be selected based on associated users, such as based on the computing nodes executing programs on behalf of a user or other entity. In addition, in some situations, an embodiment of the ONM system may be part of or otherwise affiliated with a configurable network service (or "CNS") that provides configurable private networks to multiple customers or other users of the service, such as by using cloud computing techniques with multiple computing systems that are provided on multiple physical networks (e.g., multiple physical computing systems and networks within a data center).

As previously noted, a virtual network may in some embodiments be provided as an overlay network that uses one or more intermediate physical networks as a substrate network, and one or more such overlay virtual networks may be implemented over the substrate network in various ways in various embodiments. For example, in at least some embodiments, communications between nodes of a virtual overlay network are managed by sending those communications over the substrate network without encapsulating the communications, such as by embedding virtual network address information for a computing node of the virtual network (e.g., the destination computing node's virtual network address) in a larger physical network address space used for a networking protocol of the one or more intermediate physical networks. As one illustrative example, a virtual network may be implemented using 32-bit IPv4 network addresses, and those 32-bit virtual network addresses may be embedded as part of 128-bit IPv6 network addresses used by the one or more intermediate physical networks, such as by re-headering communication packets or other data transmissions (e.g., using Stateless IP/ICMP Translation, or SIIT), or otherwise modifying such data transmissions to translate them from a first networking protocol for which they are configured to a distinct second networking protocol. As another illustrative example, both the virtual network and substrate network may be implemented using the same network addressing protocol (e.g., IPv4 or IPv6), and data transmissions sent via the provided virtual overlay network using virtual network addresses may be modified to use different physical network addresses corresponding to the substrate network while the transmissions are sent over the substrate network, but with the original virtual network addresses being stored in the modified data transmissions or otherwise tracked so that the data transmissions may be restored to their original form when they exit the substrate network. In other embodiments, at least some of the overlay networks may be implemented using encapsulation of communications. Additional details related to SIIT are available at "Request For Comments 2765—Stateless IP/ICMP Translation Algorithm", February 2000, at tools<dot>ietf<dot>org<slash>html<slash>rfc2765 (where <dot> and <slash> are replaced by the corresponding characters with those names), which is hereby incorporated by reference in its entirety. More generally, in some embodiments when implementing a first overlay network using a second substrate network, an N-bit network address that is specified for the first overlay network in accordance with a first network addressing protocol may be embedded as part of another M-bit network address that is specified for the second substrate network in accordance with a second network addressing protocol, with "N" and "M" being any integers that correspond to network addressing protocols. In addition, in at least some embodiments, an N-bit network address may be embedded in another network address using more or less than N bits of the other network address, such as if a group of N-bit network addresses of interest may be represented using a smaller number of bits (e.g., with L-bit labels or identifiers being mapped to particular N-bit network addresses and embedded in the other network addresses, where "L" is less than "N").

Various benefits may be obtained from embedding virtual network address information in substrate network addresses for an underlying physical substrate network, including enabling an overlay of the virtual network on the physical substrate network without encapsulating communications or configuring networking devices of the physical substrate network, as discussed in greater detail below. Furthermore, other information may similarly be embedded in the larger physical network address space for a communication between computing nodes in at least some embodiments and situations, such as an identifier specific to a particular virtual network that includes those computing nodes (e.g., a virtual network for a user or other entity on whose behalf those computing nodes operate). Additional details related to provision of such virtual networks via use of overlay networks are included below.

Furthermore, in addition to managing ongoing modifications for provided virtual networks, the ONM system may use the described techniques to provide various other benefits in various situations, such as limiting communications to and/or from computing nodes of a particular virtual network to other computing nodes that belong to that virtual network. In this manner, computing nodes that belong to multiple virtual networks may share parts of one or more intermediate physical networks, while still maintaining network isolation for computing nodes of a particular virtual network. In addition, the use of the described techniques also allows computing nodes to easily be added to and/or removed from a virtual network, such as to allow a user to dynamically modify the size of a virtual network (e.g., to dynamically modify the quantity of computing nodes to reflect an amount of current need for more or less computing resources). Furthermore, the use of the described techniques also supports changes to an underlying substrate network—for example, if the underlying substrate network is expanded to include additional computing nodes at additional geographical locations, existing or new virtual computer networks being provided may seamlessly use those additional computing nodes, since the underlying substrate network will route communications to and from the substrate network addresses for those additional computing nodes in the same manner as for other previously existing substrate network computing nodes. In at least some embodiments, the underlying substrate network may be of any size (e.g., spanning multiple countries or continents), without regard to network latency between computing nodes at different locations.

For illustrative purposes, some embodiments are described below in which specific types of computing nodes, networks, communications, and configuration operations are performed. These examples are provided for illustrative purposes and are simplified for the sake of brevity, and the inventive techniques can be used in a wide variety of other situations, some of which are discussed below.

FIG. 1 is a network diagram illustrating an example embodiment of configuring and managing communications between computing nodes belonging to a virtual network, so that the communications are overlaid on one or more intermediate physical networks in a manner transparent to the computing nodes. In this example, the configuring and managing of the communications is facilitated by a system manager module and multiple communication manager modules of an example embodiment of the ONM system. The example ONM system may be used, for example, in conjunction with a publicly accessible program execution service and/or publicly accessible configurable network service, or instead may be used in other situations, such as with any use of virtual networks on behalf of one or more entities (e.g., to support multiple virtual networks for different parts of a business or other organization on a private network of the organization).

The illustrated example includes an example data center 100 with multiple physical computing systems operated on behalf of the ONM system. The example data center 100 is connected to a global internet 135 external to the data center 100, which provides access to one or more computing systems 145a via private network 140, to one or more other globally accessible data centers 160 that each have multiple computing systems, and to one or more other computing systems 145b. The global internet 135 may be, for example, a publicly accessible network of networks, possibly operated by various distinct parties, such as the Internet, and the private network 140 may be, for example, a corporate network that is wholly or partially inaccessible from computing systems external to the private network 140. Computing system 145b may be, for example, a home computing system or mobile computing device that connects directly to the Internet (e.g., via a telephone line, cable modem, a Digital Subscriber Line ("DSL"), cellular network or other wireless connection, etc.).

The example data center 100 includes a number of physical computing systems 105a-105d and 155a-155n, as well as a Communication Manager module 150 that executes on one or more other computing systems (not shown) to manage communications for the associated computing systems 155a-155n, and a System Manager module 110 that executes on one or more computing systems (not shown). In this example, each physical computing system 105a-105d hosts multiple virtual machine computing nodes and includes an associated virtual machine ("VM") communication manager module (e.g., as part of a virtual machine hypervisor monitor for the physical computing system), such as VM Communication Manager module 109a and virtual machines 107a on computing system 105a, and such as VM Communication Manager module 109d and virtual machines 107d on computing system 105d. Physical computing systems 155a-155n do not execute any virtual machines in this example, and thus may each act as a computing node that directly executes one or more software programs on behalf of a user. The Communication Manager module 150 that manages communications for the associated computing systems 155a-155n may have various forms, such as, for example, a proxy computing device through which communications to and from the physical computing systems travel, or a networking device (e.g., a switch, router, hub, etc.) through which communications to and from the physical computing systems travel. In other embodiments, all or none of the physical computing systems at the data center may host virtual machines.

This example data center 100 further includes multiple networking devices, such as switches 115a-115b, edge routers 125a-125c, and core routers 130a-130c. Switch 115a is part of a physical network that includes physical computing systems 105a-105c, and is connected to edge router 125a. Switch 115b is part of a distinct physical network that includes physical computing systems 105d and 155a-155n, as well as the computing systems providing the Communication Manager module 150 and the System Manager module 110, and is connected to edge router 125b. The physical networks established by switches 115a-115b, in turn, are connected to each other and other networks (e.g., the global internet 135) via an intermediate interconnection network 120, which includes the edge routers 125a-125c and the core routers 130a-130c. The edge routers 125a-125c provide gateways between two or more networks. For example, edge router 125a provides a gateway between the physical network established by switch 115a and the interconnection network 120, while edge router 125c provides a gateway between the interconnection network 120 and global internet 135. The core routers 130a-130c manage communications within the interconnection network 120, such as by forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on network topology, etc.).

The illustrated System Manager module and Communication Manager modules may perform at least some of the described techniques in order to configure, authorize and otherwise manage communications sent to and from associated computing nodes, including to support various dynamic modifications to one or more virtual networks that are provided using various of the computing nodes. For example, Communication Manager module 109a manages associated virtual machine computing nodes 107a, Communication Manager module 109d manages associated virtual machine computing nodes 107d, and each of the other Communication Manager modules may similarly manage communications for a group of one or more other associated computing nodes. The illustrated Communication Manager modules may configure communications between computing nodes so as to overlay a particular virtual network over one or more intermediate physical networks that are used as a substrate network, such as over the interconnection network 120. Furthermore, a particular virtual network may optionally be extended beyond the data center 100 in some embodiments, such as if one or more other data centers 160 also provide computing nodes that are available for use by the example ONM system, and the particular virtual network includes computing nodes at two or more such data centers at two or more distinct geographical locations. Multiple such data centers or other geographical locations of one or more computing nodes may be inter-connected in various manners, such as via a private connection (e.g., a dedicated physical connection that is not shared with any third parties, a VPN or other mechanism that provides the private connection over a public network, etc.), directly via one or more public networks, etc. In addition, while not illustrated here, other such data centers or other geographical locations may each include one or more other Communication Manager modules that manage communications for computing systems at that data center or other geographical location, as well as over the global internet 135 to the data center 100 and any other such data centers 160.

In addition, a particular virtual network may optionally be extended beyond the data center 100 in other manners in other embodiments, such as based on one or more other Communication Manager modules at the data center 100 that are placed between edge router 125c and the global internet 135, or instead based on one or more other Communication Manager modules external to the data center 100 (e.g., another Communication Manager module that is part of private network 140, so as to manage communications for computing systems 145a over the global internet 135 and private network 140; etc.). Thus, for example, if an organization operating private network 140 desires to virtually extend its private network 140 to one or more of the computing nodes of the data center 100, it may do so by implementing one or more communication manager modules as part of the private network 140 (e.g., as part of the interface between the private network 140 and the global internet 135)—in this manner computing systems 145a within the private network 140 may communicate with those data center computing nodes as if those data center computing nodes were part of the private network. In addition, as previously noted, computing system 145b may be a home computing system, and in some embodiments a particular home computing system 145b may be part of a virtual network that includes computing nodes at a data center, such as by managing communications to the home computing system 145b via a Communication Manager module at the data center or that is implemented as part of the home computing system 145b, or instead by performing a logical move of the home computing system 145b to the data center.

Thus, as one illustrative example, one of the virtual machine computing nodes 107a on computing system 105a (in this example, virtual machine computing node 107a1) may be part of the same virtual local network as one of the virtual machine computing nodes 107d on computing system 105d (in this example, virtual machine computing node 107d1), such as with IPv4 being used to represent the virtual network addresses for the virtual local network. The virtual machine 107a1 may then direct an outgoing communication (not shown) to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication, such as based on previously obtained information about the sending virtual machine computing node 107a1 and/or about the destination virtual machine computing node 107d1 (e.g., information about virtual networks and/or entities with which the computing nodes are associated), and/or by dynamically interacting with the System Manager module 110 (e.g., to obtain an authorization determination, to obtain some or all such information, etc.). By not delivering unauthorized communications to computing nodes, network isolation and security of entities' virtual networks is enhanced.

If the Communication Manager module 109a determines that the outgoing communication is authorized (or does not perform such an authorization determination), the module 109a determines the actual physical network location corresponding to the destination virtual network address for the communication. For example, the Communication Manager module 109a may determine the actual destination network address to use for the virtual network address of the destination virtual machine 107d1 by dynamically interacting with the System Manager module 110, or may have previously determined and stored that information (e.g., in response to a request from the sending virtual machine 107a1 for information about that destination virtual network address, such as a request that the virtual machine 107a1 specifies using Address Resolution Protocol, or ARP). The Communication Manager module 109a then re-headers or otherwise modifies the outgoing communication so that it is directed to Communication Manager module 109d using an actual substrate network address, such as if Communication Manager module 109d is associated with a sub-network that includes a range of multiple such actual substrate network addresses. FIGS. 2A-2D provide examples of doing such communication management in some embodiments.

When Communication Manager module 109d receives the communication via the interconnection network 120, it obtains the virtual destination network address for the communication (e.g., by extracting the virtual destination network address from the communication), and determines to which of the virtual machine computing nodes 107d managed by the Communication Manager module 109d that the communication is directed. The Communication Manager module 109d next determines whether the communication is authorized for the destination virtual machine computing node 107d1, with examples of such authorization activities discussed in further detail in the examples of FIGS. 2A-2D. If the communication is determined to be authorized (or the Communication Manager module 109d does not perform such an authorization determination), the Communication Manager module 109d then re-headers or otherwise modifies the incoming communication so that it is directed to the destination virtual machine computing node 107d1 using an appropriate virtual network address for the virtual network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d may also perform additional steps related to security, as discussed in greater detail elsewhere.

In addition, after the example communication has been sent from the virtual machine computing node 107a1 and received by the destination virtual machine computing node 107d1, a determination may be made to move the virtual machine computing node 107d1 to a new physical location. In this example, the computing node move involves the use of a new computing node at the new physical location that will take over the ongoing role of actual prior computing node 107d1 within the virtual network and will act as a logically moved computing node 107d1, although in other situations an actual move of associated computing system hardware that supports prior computing node 107d1 may occur. The new computing node may be, for example, one of the virtual machine computing nodes 107c on computing system 105c (e.g., virtual machine computing node 107c1), one of the computing systems 155a-155n, or instead another virtual machine computing node (not shown) that is part of another physical network (not shown) within the data center 100 that is supported by another switch (not shown). Such a computing node move determination may be made, for example, automatically by the ONM System Manager module 110 (e.g., based on a determination that computing system 105d is over-utilized and/or that the new computing node is under-utilized, based on a determination that computing system 105d is likely to fail imminently or has already failed, based on the new computing node providing cost benefits or other advantages relative to the prior computing node 107d1 for the ONM system and/or for an associated user on whose behalf the virtual network is provided, etc.), or instead in other manners (e.g., based on a request received from a user on whose behalf the virtual network is provided). The actual migration or other logical move of the computing node 107d1 to the new computing node may be performed in various manners, as discussed in greater detail elsewhere, including by executing software from the prior computing node 107d1 on the new computing node and assigning ongoing functionality of the prior computing node 107d1 to the new computing node, as well as assigning the virtual network address previously used by the prior computing node 107d1 to the new computing node.

Once the new computing node is available, the System Manager module 110 may take various actions to manage communications to reflect the modified virtual network. For example, if the Communication Manager modules maintain state information about other computing nodes of the virtual network (e.g., if Communication Manager module 109a maintains information that the virtual network address used by the prior computing node 107d1 was associated with Communication Manager module 109d, such as for a limited time after the prior communication was sent by computing node 107a1), the System Manager module 110 may propagate updated mapping information to Communication Manager module 109a and/or to other Communication Manager modules to reflect the moved computing node (e.g., if the new computing node is virtual machine computing node 105c1, to specify that the virtual network address for prior computing node 107d1 is now associated with the Communication Manager module 109c, or instead is associated with another Communication Manager module if the new computing node is located elsewhere), or may instead indicate to such Communication Manager modules that the old stored mapping information for the virtual network address used by prior computing node 107d1 is no longer valid. Accordingly, new communications that are sent to the virtual network address for prior computing node 107d1 from computing node 107a1 or other computing nodes that are part of the virtual network will now be directed to the new virtual computing node. The example of FIG. 2C provides additional details regarding an example computing node move.

By managing virtual network modifications using the described techniques, the ONM system provides various benefits. For example, because the various Communication Manager modules manage the overlay virtual network, modifications are not needed to the interconnection network 120 or switches 115a-115b to support the example computing node move or other virtual network modifications. In particular, since the Communication Manager modules manage communications to use appropriate substrate network addresses, such as to use a different substrate network address for the new computing node that now represents the moved prior computing node 107d1, the interconnection network 120 will route the communications using the specified substrate network addresses for the communications, and without using any information about corresponding virtual network addresses. Absent the management of communications by the Communication Manager modules, additional steps may need to be taken to support a computing node move to a new networking layer 2 switch. For example, at least some networking layer 2 switches may each act as a network bridge and store information about local computing nodes associated with the sub-network for the switch (e.g., an ARP table that associates local computing nodes' network addresses with MAC, or "Media Access Control," addresses or other computing node hardware addresses)—if so, and if those switches were instead used to resolve requests for computing node address information without using Communication Manager modules to manage the communications, such switches would at times provide incorrect information after a computing node move or other virtual network modification unless additional steps were taken to update such stored information to reflect the virtual network modification (e.g., an additional step of a moved computing node sending a new communication from its new location that uses its unchanged virtual network address as the communication's source network address, so that a local layer 2 switch would update its stored information to reflect that the virtual network address is associated with the new computing node location).

Figure 2A:
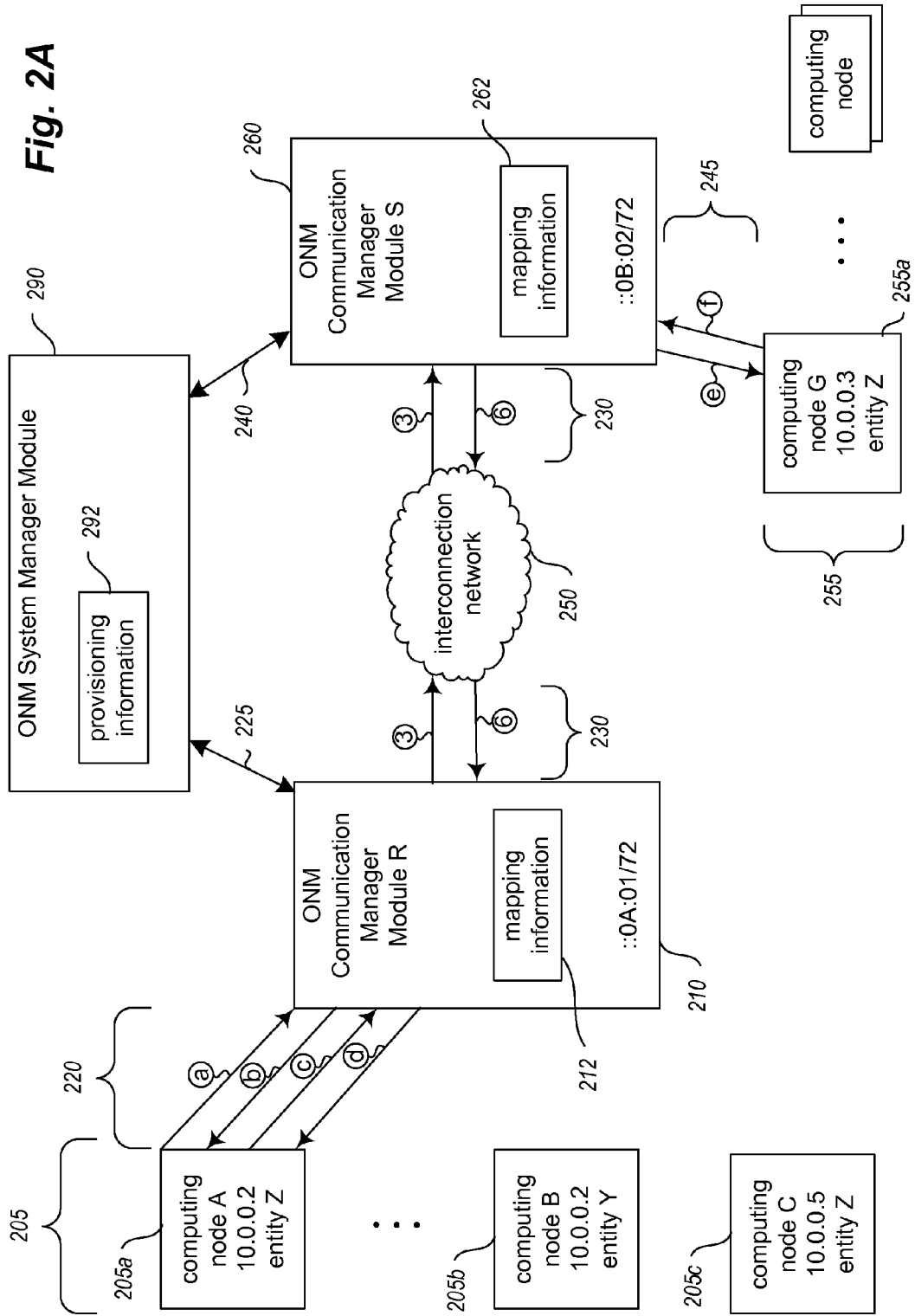
Figure 2B:
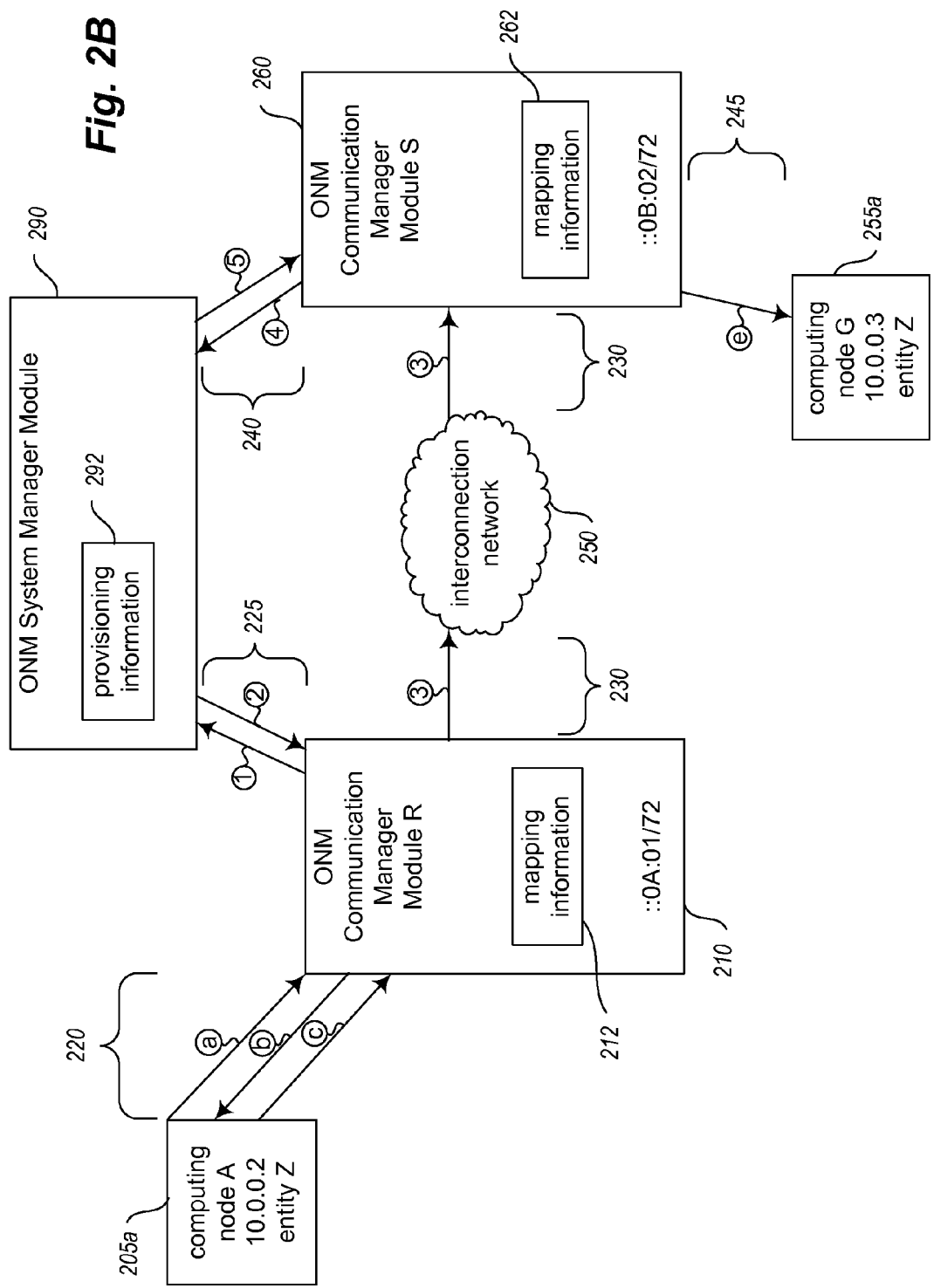

FIGS. 2A-2C illustrate further examples with additional illustrative details related to managing communications between computing nodes that occur via an overlay network over one or more physical networks, such as may be used by the computing nodes and networks of FIG. 1 or in other situations. In particular, FIG. 2A illustrates various example computing nodes 205 and 255 that may communicate with each other by using one or more intermediate interconnection networks 250 as a substrate network. In this example, the physical interconnection network 250 is an IPv6 substrate network on which IPv4 virtual networks are overlaid, although in other embodiments the physical interconnection network 250 and overlay virtual networks may use the same networking protocol (e.g., IPv4). In addition, in this example embodiment, the computing nodes are operated on behalf of multiple distinct entities, and a System Manager module 290 manages the association of particular computing nodes with particular entities and virtual networks. The example computing nodes of FIG. 2A include three computing nodes executed on behalf of an example entity Z, those being computing nodes 205a, 205c and 255a. In addition, other computing nodes are operated on behalf of other entities, such as computing node 205b.

In this example, the computing nodes 205 are managed by an associated Communication Manager module R 210, and the computing nodes 255 are managed by an associated Communication Manager module S 260. As one example, computing nodes 205 may each be one of multiple virtual machines hosted by a single physical computing system, and Communication Manager module R may be part of a hypervisor virtual machine monitor for that physical computing system. For example, with reference to FIG. 1, computing nodes 205 could represent the virtual machines 107a, and computing nodes 255 could represent the virtual machines 107d. If so, Communication Manager module R would correspond to Communication Manager module 109a of FIG. 1, Communication Manager module S would correspond to Communication Manager module 109d of FIG. 1, the interconnection network 250 would correspond to interconnection network 120 of FIG. 1, and the System Manager module 290 would correspond to System Manager module 110 of FIG. 1. Alternatively, computing nodes 205 or 255 may instead each be a distinct physical computing system, such as to correspond to computing systems 155a-155n of FIG. 1.

Each of the Communication Manager modules of FIG. 2A is associated with a sub-network of multiple physical substrate network addresses, which the Communication Manager modules manage on behalf of their associated computing nodes. For example, Communication Manager module R is shown to be associated with the IPv6 network address range of "::0A:01/72", which corresponds to the 128-bit addresses (in hexadecimal) from XXXX:XXXX:XXXX:XXXA:0100:0000:0000:0000 to XXXX:XXXX:XXXX:XXXA:01FF:FFFF:FFFF:FFFF (representing 2 to the power of 56 unique IPv6 addresses), where each "X" may represent any hexadecimal character that is appropriate for a particular situation (e.g., with the initial 64 bits corresponding a particular organization and network topology, as discussed in greater detail with respect to FIG. 2D). The interconnection network 250 will forward any communication with a destination network address in that range to Communication Manager module R—thus, with the initial 72 bits of the range specified, the Communication Manager module R may use the remaining available 56 bits to represent the computing nodes that it manages and to determine how to process incoming communications whose destination network addresses are in that range.

For purposes of the example shown in FIG. 2A, computing nodes 205a, 205c and 255a are part of a single virtual local network for entity Z, and have assigned IPv4 virtual network addresses of "10.0.0.2", "10.0.0.5" and "10.0.0.3", respectively. Because computing node 205b is part of a distinct virtual network for entity Y, it can share the same virtual network address as computing node 205a without confusion. In this example, computing node A 205a wants to communicate with computing node G 255a, which it believes is part of a common local physical network with computing node A, as the interconnection network 250 and Communication Manager modules are transparent to computing nodes A and G in this example. In particular, despite the physical separation of computing nodes A and G, the Communication Manager modules 210 and 260 operate so as to overlay the virtual local network for entity Z over the physical interconnection network 250 for communications between those computing nodes, so that the lack of an actual local network is transparent to the computing nodes A and G.

In order to send the communication to computing node G, computing node A exchanges various messages 220 with Communication Manager module R 210, despite in the illustrated embodiment being unaware of the existence of Communication Manager module R (i.e., computing node A may believe that it is transmitting a broadcast message to all other nodes on the local network). In particular, in this example, computing node A first sends an ARP message request 220-a that includes the virtual network address for computing node G (i.e., "10.0.0.3") and that requests the corresponding hardware address for computing node G (e.g., a 48-bit MAC address). Communication Manager module R intercepts the ARP request 220-a, and responds to computing node A with a spoofed ARP response message 220-b that includes a dummy virtual hardware address for computing node G.

To obtain the dummy virtual hardware address for the response message, the Communication Manager module R first checks a local store 212 of information that maps dummy virtual hardware addresses to corresponding IPv6 actual physical substrate network addresses, with each of the dummy virtual hardware addresses corresponding to an IPv4 virtual network address for a particular entity's virtual network. If the local store 212 does not contain an entry for computing node G (e.g., if none of the computing nodes 205 have previously communicated with computing node G, if a prior entry in local store 212 for computing node G has expired based on an associated time-to-live value, etc.), the Communication Manager module R interacts 225 with System Manager module 290 to obtain the corresponding actual IPv6 physical substrate network address for computing node G on behalf of computing node A. In particular, in this example, the System Manager module 290 maintains provisioning information 292 that identifies where each computing node is actually located and to which entity and/or virtual network the computing node belongs, such as by initiating execution of programs on computing nodes for entities and virtual networks or by otherwise obtaining such provisioning information. As discussed in greater detail with respect to FIG. 2B, the System Manager module determines whether the request from Communication Manager module R on behalf of computing node A for computing node G's actual IPv6 physical substrate network address is valid, including whether computing node A is authorized to communicate with computing node G, and if so provides that actual IPv6 physical substrate network address.

Communication Manager module R receives the actual IPv6 physical substrate network address for computing node G from the System Manager module 290, and stores this received information as part of a new entry for computing node G as part of mapping information 212 for later use (optionally with an expiration time and/or other information). In addition, Communication Manager module R determines a dummy virtual hardware address to be used for computing node G (e.g., by generating an identifier that is locally unique for the computing nodes managed by Communication Manager module R), stores that dummy virtual hardware address in conjunction with the received actual IPv6 physical substrate network address as part of the new mapping information entry, and provides the dummy virtual hardware address to computing node A as part of response message 220-b. By maintaining such mapping information 212, later communications from computing node A to computing node G may be authorized by Communication Manager module R without further interactions with the System Manager module 290, based on the use of the dummy virtual hardware address previously provided by Communication Manager module R. In other embodiments, the hardware address used by Communication Manager module R for computing node G may instead not be a dummy address, such as if System Manager module 290 further maintains information about hardware addresses used by the various computing nodes (e.g., virtual hardware addresses assigned to virtual machine computing nodes, actual hardware addresses assigned to computing systems acting as computing nodes, etc.) and provides the hardware address used by computing node G to Communication Manager module R as part of the interactions 225. In such embodiments, the Communication Manager module R may take further actions if computing nodes on different virtual networks use the same virtual hardware address, such as to map each combination of computing node hardware address and virtual network to a corresponding substrate network address.

In other embodiments, Communication Manager module R may interact with System Manager module 290 to obtain a physical substrate network address for computing node G or otherwise determine such a physical substrate network address at times other than upon receiving an ARP request, such as in response to any received communication that is directed to computing node G using the virtual network address for entity Z's virtual network, based on a move of computing node G to a new physical location or other network modification to computing node G, etc. Furthermore, in other embodiments the virtual hardware addresses that are used may differ from this example, such as if the virtual hardware addresses are specified by the System Manager module 290, if the virtual hardware addresses are not random and instead store one or more types of information specific to the corresponding computing nodes, etc. In addition, in this example, if computing node A had not been determined to be authorized to send communications to computing node G, whether by the System Manager module 290 and/or Communication Manager module R, Communication Manager module R would not send the response message 220-b with the dummy virtual hardware address (e.g., instead sends no response or an error message response).

In this example, the returned IPv6 actual physical substrate network address corresponding to computing node G in response message 225-2 is "::0B:02:<Z-identifier>10.0.0.3", where "10.0.0.3" is stored in the last 32 bits of the 128-bit IPv6 address, and where "<Z-identifier>" is a 24-bit entity network identifier for computing node G corresponding to the virtual local network for entity Z (e.g., as previously assigned by the System Manager module to that network to reflect a random number or some other number corresponding to the entity). The initial 72 bits of the IPv6 network address store the "::0B:02" designation, corresponding to the sub-network or other portion of the interconnection network with a network address range of "::0B:02/72" to which Communication Manager module S corresponds—thus, a communication sent over the interconnection network 250 to IPv6 destination network address "::0B:02:<Z-identifier>10.0.0.3" will be routed to Communication Manager module S. In other embodiments, the entity network identifier may be other lengths (e.g., 32 bits, if Communication Manager module S has a sub-network with a network address range of 64 bits rather than 56 bits) and/or may have other forms (e.g., may be random, may store various types of information, etc.), and the remaining 56 bits used for the network address range of the sub-network may store other types of information (e.g., an identifier for a particular entity, a tag or label for the virtual network, etc.). Additional details related to an example configured IPv6 actual physical network address for use with an overlay network are described with respect to FIG. 2D.

After receiving the response message 220-b from Communication Manager module R, computing node A creates and initiates the sending of a communication to computing node G, shown in FIG. 2A as communication 220-c. In particular, the header of communication 220-c includes a destination network address for destination computing node G that is "10.0.0.3", a destination hardware address for destination computing node G that is the dummy virtual hardware address provided to computing node A in message 220-b, a source network address for sending computing node A that is "10.0.0.2", and a source hardware address for sending computing node A that is an actual or dummy hardware address that was previously identified to computing node A.

Communication Manager module R intercepts the communication 220-c, modifies the communication as appropriate, and forwards the modified communication over the interconnection network 250 to computing node G. In particular, Communication Manager module R extracts the virtual destination network address and virtual destination hardware address for computing node G from the header, and then retrieves the IPv6 actual physical substrate network address corresponding to that virtual destination hardware address from mapping information 212. As previously noted, the IPv6 actual physical substrate network address in this example is "::06:02:<Z-identifier>10.0.0.3", and Communication Manager module R creates a new IPv6 header that includes that actual physical substrate network address as the destination address. Similarly, the Communication Manager module R extracts the virtual source network address and virtual source hardware address for computing node A from the header of the received communication, obtains an IPv6 actual physical substrate network address corresponding to that virtual source hardware address (e.g., from a stored entry in mapping information 212, by interacting with the System Manager module 290 to obtain that information if not previously obtained, etc.), and includes that actual physical substrate network address as the source network address for the new IPv6 header. In this example, the IPv6 actual physical substrate network address for computing node A is "::0A:01:<Z-identifier>10.0.0.2", which if used in a reply by Communication Manager module S on behalf of computing node G will be routed to Communication Manager module R for forwarding to computing node A. The Communication Manager module R then creates a new communication 230-3 by modifying communication 220-c so as to replace the prior IPv4 header with the new IPv6 header (e.g., in accordance with SIIT), including populating the new IPv6 header with other information as appropriate for the new communication (e.g., payload length, traffic class packet priority, etc.). Thus, the new communication 230-3 includes the same content or payload as prior communication 220-c, without encapsulating the prior communication 220-c within the new communication 230-3. Furthermore, access to the specific information within the payload is not needed for such re-headering, such as to allow Communication Manager module R to handle communications in which the payload is encrypted without needing to decrypt that payload.

In at least some embodiments, before forwarding communication 230-3 to Communication Manager module S, Communication Manager module R may perform one or more actions to determine that communication 220-c is authorized to be forwarded to computing node G as communication 230-3, such as based on the mapping information 212 including a valid entry for the source and/or destination virtual hardware address used in communication 220-c. In other embodiments, such an authorization determination may not be performed by Communication Manager module R for each outgoing communication, or instead may be performed in other manners (e.g., based on a determination that the sending node and destination node are part of the same virtual network or are associated with the same entity or are otherwise authorized to inter-communicate, based on an interaction with System Manager module 290 to obtain an authorization determination for the communication, etc.).

After Communication Manager module R forwards the modified communication 230-3 to the interconnection network 250, the interconnection network uses the physical IPv6 destination network address of the communication to route the communication to Communication Manager module S. In doing so, the devices of the interconnection network 250 do not use the portion of the destination network address that includes the embedded entity network identifier or embedded virtual network address, and thus do not need any special configuration to forward such a communication, nor even awareness that a virtual network is being overlaid on the physical interconnection network.

When Communication Manager module S receives communication 230-3 via the interconnection network 250, it performs actions similar to those of Communication Manager module R, but in reverse. In particular, in at least some embodiments, the Communication Manager module S verifies that communication 230-3 is legitimate and authorized to be forwarded to computing node G, such as via one or more interactions 240 with the System Manager module. If the communication is determined to be authorized (or if the authorization determination is not performed), the Communication Manager module S then modifies communication 230-3 as appropriate and forwards the modified communication to computing node G. Additional details related to the verification of the communication 230-3 are discussed with respect to FIG. 2B.

In particular, to modify communication 230-3, Communication Manager module S retrieves information from mapping information 262 that corresponds to computing node G, including the virtual hardware address used by computing node G (or generates such a virtual hardware address if not previously available, such as for a new computing node). Communication Manager module S then creates a new communication 245-e by modifying communication 230-3 so as to replace the prior IPv6 header with a new IPv4 header (e.g., in accordance with SIIT). The new IPv4 header includes the virtual network address and virtual hardware address for computing node G as the destination network address and destination hardware address for the new IPv4 header, the virtual network address and a dummy virtual hardware address for computing node A as the source network address and source hardware address for the new IPv4 header, and includes other information as appropriate for the new communication (e.g., total length, header checksum, etc.). The dummy virtual hardware address used by Communication Manager module S for computing node A may be the same as the hardware address used by Communication Manager module R for computing node A, but in other embodiments each Communication Manager module may maintain separate hardware address information that is not related to the information used by the other Communication Manager modules (e.g., if Communication Manager module S generated its own dummy virtual hardware address for computing node A in response to a prior ARP request from one of the computing nodes 255 for computing node A's hardware address). Thus, the new communication 245-e includes the same content or payload as prior communication 220-c and 230-3. Communication Manager module S then forwards new communication 245-e to computing node G.

After receiving communication 245-e, computing node G determines to send a response communication 245-f to computing node A, using the source virtual network address and source virtual hardware address for computing node A from communication 245-e. Communication Manager module S receives response communication 245-f, and processes it in a manner similar to that previously described with respect to communication 220-c and Communication Manager module R. In particular, Communication Manager module S optionally verifies that computing node G is authorized to send communications to computing node A, and then modifies communication 245-f to create communication 230-6 by generating a new IPv6 header using mapping information 262. After forwarding communication 230-6 to the interconnection network 250, the communication is sent to Communication Manager module R, which processes the incoming communication in a manner similar to that previously described with respect to communication 230-3 and Communication Manager module S. In particular, Communication Manager module R optionally verifies that computing node G is authorized to send communications to computing node A and that communication 230-6 actually was sent by computing node G, and then modifies communication 230-6 to create communication 220-d by generating a new IPv4 header using mapping information 212. Communication Manager module R then forwards communication 220-d to computing node A.

In this manner, computing nodes A and G may intercommunicate using a IPv4-based virtual local network, without any special configuration of those computing nodes to handle the actual intervening IPv6-based substrate interconnection network, and interconnection network 250 may forward IPv6 communications without any special configuration of any networking devices of the interconnection network, based on the Communication Manager modules overlaying the virtual local network over the actual physical interconnection network without encapsulation of communications and on using embedded virtual network addresses in the substrate physical network addresses.

In addition, while not illustrated with respect to FIG. 2A, in at least some embodiments the Communication Manager modules may receive and handle other types of requests and communications on behalf of associated computing nodes. For example, Communication Manager modules may take various actions to support broadcast and multicast capabilities for computing nodes that they manage. As one example, in some embodiments, a special multicast group virtual network address suffix may be reserved from each entity network identifier prefix for use in signaling networking Layer 2 raw encapsulated communications. Similarly, for link-local broadcast and multicast communications, a special multicast group/64 prefix may be reserved (e.g., "FF36:0000::"), while a different destination address prefix (e.g., "FF15:0000::") may be used for other multicast communications. Thus, for example, multicast and broadcast IP frames may be encapsulated using a corresponding reserved 64-bit prefix for the first 64 bits of the 128-bit IPv6 address, with the remaining 64 bits including the virtual IPv4 network address for the destination computing node and the entity network identifier for the destination computing node in a manner similar to that previously described. Alternatively, in other embodiments, one or more types of broadcast and/or multicast communications may each have a corresponding reserved label or other identifier that has a different value or form, including using a different number of bits and/or being stored in a manner other than as a network address prefix. When a computing node sends a broadcast/multicast communication, any Communication Manager module with an associated computing node that has subscribed to that multicast/broadcast group would be identified (e.g., based on those Communication Manager modules having subscribed to the group, such as in response to prior join communications sent by those associated computing nodes), and the Communication Manager module for the sending computing node would forward the communication to each of the identified Communication Manager modules of the group, for forwarding to their appropriate managed computing nodes. In addition, in some embodiments and situations, at least some broadcast or multicast communications may not be forwarded by Communication Manager modules, such as communications with an IPv4 prefix of 224.0/16 or another designated prefix or other label or identifier.

In addition, it will be appreciated that a Communication Manager module may facilitate communications between multiple of the computing nodes that are associated with that Communication Manager module. For example, with respect to FIG. 2A, computing node 205a may wish to send an additional communication (not shown) to computing node 205c. If so, Communication Manager module R would perform actions similar to those previously described with respect to the handling of outgoing communication 220-c by Communication Manager module R and the handling of incoming communication 230-3 by Communication Manager module S, but without re-headering of the additional communication to use an IPv6 header since the communication will not travel over the interconnection network.

While not illustrated with respect to FIG. 2A, in at least some embodiments other types of requests and communications may also be handled in various ways. For example, in at least some embodiments, an entity may have one or more computing nodes that are managed by Communication Manager module(s) and that are part of a virtual network for that entity, and may further have one or more other non-managed computing systems (e.g., computing systems that are directly connected to the interconnection network 250 and/or that natively use IPv6 network addressing) that do not have an associated Communication Manager module that manages their communications. If the entity desires that those non-managed computing systems be part of that virtual network or otherwise communicate with the managed computing nodes of the virtual network, such communications between managed computing nodes and non-managed computing systems may be handled by the Communication Manager module(s) that manage the one or more computing nodes in at least some such embodiments. For example, in such situations, if such a non-managed computing system is provided with an actual IPv6 destination network address for such a managed computing node (e.g., "::0A:01:<Z-identifier>10.0.0.2" for managed computing node A in this example), the non-managed computing system may send communications to computing node A via interconnection network 250 using that destination network address, and Communication Manager module R would forward those communications to computing node A (e.g., after re-headering the communications in a manner similar to that previously described) if Communication Manager module R is configured to accept communications from that non-managed computing system (or from any non-managed computing system). Furthermore, Communication Manager module R could generate a dummy virtual network address to correspond to such a non-managed computing system, map it to the actual IPv6 network address for the non-managed computing system, and provide the dummy virtual network address to computing node A (e.g., as the source address for the communications forwarded to computing node A from the non-managed computing system), thus allowing computing node A to send communications to the non-managed computing system.

Similarly, in at least some embodiments and situations, at least some managed computing nodes and/or their virtual networks may be configured to allow communications with other devices that are not part of the virtual network, such as other non-managed computing systems or other types of network appliance devices that do not have an associated Communication Manager module that manages their communications. In such situations, if the managed computing nodes and/or the virtual network is configured to allow communications with such other non-managed devices, such a non-managed device may similarly be provided with the actual IPv6 destination network address for such a computing node (e.g., "::0A:01:<Z-identifier>10.0.0.2" for computing node A in this example), allowing the non-managed device to send communications to computing node A via interconnection network 250 using that destination network address, with Communication Manager module R then forwarding those communications to computing node A (e.g., after re-headering the communications in a manner similar to that previously described). Furthermore, Communication Manager module R could similarly manage outgoing communications from computing node A to such a non-managed device to allow computing node A to send such communications.

In addition, as previously noted, a communication manager module manages communications for associated computing nodes in various ways, including in some embodiments by assigning virtual network addresses to computing nodes of a virtual network, and/or by assigning substrate physical network addresses to managed computing nodes from a range of substrate physical network addresses that correspond to the communication manager module. In other embodiments, some such activities may instead be performed by one or more computing nodes of the virtual network, such as to allow a DHCP (Dynamic Host Configuration Protocol) server or other device of a virtual network to specify virtual network addresses and/or substrate physical network addresses to particular computing nodes of the virtual network. In such embodiments, the communication manager module obtains such configuration information from the virtual network device(s), and updates its mapping information accordingly (and in some embodiments may further update one or more system manager modules that maintain information about computing nodes associated with virtual networks).

In addition, in some embodiments and situations, a managed computing node may itself be treated as a phantom router, with multiple virtual network addresses associated with that managed computing node, and with that managed computing node forwarding communications to other computing nodes that correspond to those multiple virtual network addresses. In such embodiments, the communication manager module that manages communications for that managed computing node router handles communications to and from that computing node in a manner similar to that previously described. However, the communication manager module is configured with the multiple virtual network addresses that correspond to the managed computing node router, so that incoming communications to any of those multiple virtual network addresses are forwarded to the managed computing node router, and so that outgoing communications from the managed computing node router are given a substrate source physical network address that corresponds to the particular computing node that sent the communication via the managed computing node router. In this manner, physical routers or other networking devices of a particular customer or other entity may be virtually represented for a virtual network implemented for that entity.

FIG. 2B illustrates some of the computing nodes and communications discussed with respect to FIG. 2A, but provides additional details with respect to some actions taken by the Communication Manager modules 210 and 260 and/or the System Manager module 290 to authorize communications between computing nodes. For example, after computing node A sends message 220-*a* to request a hardware address for computing node G, Communication Manager module R may perform one or more interactions 225 with the System Manager module 290 in order to determine whether to provide that information, such as based on whether computing node A is authorized to communicate with computing node G, as well as to determine a corresponding substrate physical network address for computing node G based on interconnection network 250. If the Communication Manager module R has previously obtained that information and it remains valid (e.g., has not expired), then the interactions 225 may not be performed. In this example, to obtain the desired physical network address corresponding to computing node G, Communication Manager module R sends a message 225-1 to the system manager module 290 that includes the virtual network addresses for computing nodes A and G, and that includes an entity network identifier for each of the computing nodes, which in this example is an entity network identifier for entity Z (e.g., a 32-bit or 24-bit unique identifier). In at least some embodiments, Communication Manager module R may send message 225-1 to the system manager module 290 using an anycast addressing and routing scheme, so that multiple System Manager modules may be implemented (e.g., one for each data center that includes Communication Manager modules and associated computing nodes) and an appropriate one of those (e.g., the nearest, the most underutilized, etc.) is selected to receive and handle the message.

After the System Manager module 290 determines that computing node A is authorized to communicate with computing node G (e.g., based on having the same entity network identifier, based on computing node A having an entity network identifier that is authorized to communicate with computing nodes of the entity network identifier for computing node G, based on other information provided by or associated with computing node A indicating that computing node A is authorized to perform such communications, based on information provided by or associated with computing node G indicating that computing node A is authorized to perform such communications, etc.), the System Manager module 290 returns a response message 225-2 that includes the desired actual physical substrate network address corresponding to computing node G. In addition, in at least some embodiments, before sending the desired actual physical network address, the System Manager module 290 may further verify that Communication Manager module R is authorized to send the message 225-1 on behalf of computing node A, such as based on computing node A being determined to be one of the computing nodes to which Communication Manager module R is associated.

In other embodiments, Communication Manager module R may perform some or all of the actions described as being performed by System Manager module 290, such as to maintain provisioning information for the various computing nodes and/or to determine whether computing node A is authorized to send communications to computing node G, or instead no such authorization determination may be performed in some or all situations. Furthermore, in other embodiments other types of authorization determinations may be performed for a communication between two or more computing nodes, such as based on a type of the communication, on a size of the communication, on a time of the communication, etc.

As previously noted with respect to FIG. 2A, after Communication Manager module S receives communication 230-3 intended for computing node G via the interconnection network 250, Communication Manager module S may perform one or more interactions 240 with the System Manager module 290 in order to determine whether to authorize that communication. In particular, in this example, to verify that the communication 230-3 is valid and authorized to be forwarded to computing node G, Communication Manager module S first extracts the actual IPv6 destination network address and actual IPv6 source network address from the header of communication 230-3, and then retrieves the embedded entity network identifiers and virtual network addresses from each of the extracted IPv6 network addresses. The Communication Manager module S next exchanges messages 240 with System Manager module 290 to obtain the corresponding actual IPv6 physical network address for the sending computing node A on behalf of computing node G, including a message 240-4 that includes the extracted virtual network addresses for computing nodes A and G and the entity network identifier for each of the computing nodes. In at least some embodiments, Communication Manager module S may send message 240-4 to the System Manager module 290 using an anycast addressing and routing scheme as previously described.

The System Manager module 290 receives message 240-4, and returns a response message 240-5 that includes the actual physical substrate network address corresponding to computing node A, which in this example is "::0A:01:<Z-identifier>10.0.0.2". As previously discussed with respect to messages 225-1 and 225-2, in some embodiments the System Manager module 290 and/or Communication Manager module S may further perform one or more other types of authorization determination activities, such as to determine that computing node G is authorized to communicate with computing node A, that Communication Manager module S is authorized to send the message 240-4 on behalf of computing node G, etc. Communication Manager module S then verifies that the returned physical network address in message 240-5 matches the source IPv6 network address extracted from the header of communication 230-3, so as to prevent attempts to spoof messages as being from computing node A that are actually sent from other computing nodes in other locations. Communication Manager module S optionally stores this received information in message 240-5 as part of an entry for computing node A in mapping information 262 for later use, along with computing node A's virtual network address and a dummy virtual hardware address for computing node A.

In addition to taking actions to verify that the received communication 230-3 intended for computing node G is valid and authorized, Communication Manager module S may also in some embodiments take actions to support computing node moves and other virtual network modifications, such as if computing node G was recently moved to a new physical network location and is no longer associated with Communication Manager module S as of the time that Communication Manager module R forwards communication 230-3 to Communication Manager module S. Such an incorrectly forwarded communication may occur, for example, if Communication Manager module R had previously stored mapping information 212 that indicated that computing node G was associated with the actual physical substrate network for Communication Manager module S, but has not yet updated that information based on computing node G's recent move. If so, interactions 225 with the System Manager module 290 may not be performed by Communication Manager module R in at least some such embodiments, and Communication Manager module R may mistakenly forward communication 230-3 intended for computing node G to Communication Manager module S. FIG.

2C provides additional details about such an example move of computing node G, and discusses additional actions that Communication Manager module S may take in such a situation if it receives communication 230-3 intended for moved computing node G.

In a similar manner, in addition to taking actions to verify that the outgoing communication 230-3 intended for computing node G is valid and authorized, Communication Manager module R may also in some embodiments take actions to support computing node moves and other virtual network modifications. For example, if computing node G was recently moved to a new physical network location and is no longer associated with Communication Manager module S, Communication Manager module R instead may have already updated mapping information 212 as part of that computing node move before outgoing communication 220-c is received from computing node A, and if so would instead direct the outgoing communication 230-3 to the new physical network location of computing node G in a manner similar to that previously discussed. FIG. 2C provides additional details about such an example move of computing node G.

Alternatively, one or more other types of virtual network modifications may have occurred to cause Communication Manager module R to take other types of actions to manage such virtual network modifications, instead of computing node G being moved. For example, after having previously sent one or more other communications (not shown), computing node A may modify the virtual network address that it uses, such as part of sending an alternative version of outgoing communication 220-c to computing node G that uses a new virtual network address "10.0.0.9" to represent the sending computing node A (rather than the virtual network address "10.0.0.2" that was used in the previous example of sending outgoing communication 220-c). The use of the new virtual network address may reflect a change to the previous virtual network address "10.0.0.2" that is assigned to and used by computing node A for the virtual network, or instead may reflect the creation of a new second logical network interface for computing node A for the virtual network (or instead a new second network interface for computing node A that corresponds to a distinct second virtual network in which computing node A will also begin participating).

If the ONM system is notified of the new virtual network address as part of the modification process (e.g., by computing node A or by a user associated with the virtual network, such as via an API or GUI provided by the System Manager module 290), Communication Manager module R may be prompted (e.g., by the System Manager module 290) to take corresponding actions before the outgoing communication 220-c with the new virtual network address is received, such as to update mapping information 212 to include an entry that corresponds to the new virtual network address. For example, if the new virtual network address is based on a change to the previous virtual network address, the Communication Manager module R may update the existing entry (if any) in mapping information 212 that associates the previous virtual network address "10.0.0.2" with a corresponding dummy hardware address, so that the corresponding dummy hardware address is now associated with the new virtual network address "10.0.0.9" in the updated entry. Alternatively, if the new virtual network address corresponds to a new network interface for computing node A, the Communication Manager module R may instead create a new entry in mapping information 212 that associates the new virtual network address "10.0.0.9" with a new dummy hardware address, such that computing node A may have multiple distinct entries in mapping information 212 that correspond to its multiple associated virtual network addresses. If the mapping information 212 had been updated in this manner before the alternative version of communication 220-c is received by the Communication Manager module R, the Communication Manager module R would then take actions similar to those previously described in forwarding the communication to the destination computing node G at its new network location.

Alternatively, if computing node A uses a new virtual network address when sending the alternative version of outgoing communication 220-c to computing node G as previously described, but the ONM system is not previously explicitly notified of the new virtual network address, Communication Manager module R instead may take other actions to manage such a virtual network modification. For example, by monitoring the virtual network address(es) used by computing node A, Communication Manager module R may automatically detect the new virtual network address, and may be configured to take various types of corresponding actions. As one example, Communication Manager module R may be configured to prevent any such modifications to the virtual network address(es) used by computing node A without prior explicit notification, such as to prevent spoofing activities by computing node A (e.g., if the operations of computing node A are compromised by a malicious user). Alternatively, Communication Manager module R may be configured to allow such modifications to the virtual network address(es) used by computing node A without prior explicit notification in at least some circumstances, and thus may determine whether any such specified circumstances exist.

If Communication Manager module R determines that the virtual network address modification for computing node A is allowed without the prior explicit notification, whether based on any specified circumstances existing or instead so as to allow such virtual network address modification in any circumstances, it may take similar actions to those described previously with respect to an explicit notification of such virtual network address modification. For example, Communication Manager module R may notify System Manager module 290 of the new virtual network address, so that System Manager module 290 may update provisioning information 292 accordingly, and optionally provide information regarding whether the new virtual network address represents a change to the prior virtual network address or instead a new network interface. Alternatively, Communication Manager module R may delay a decision as to whether the new virtual network address represents a change to the prior virtual network address or instead a new network interface, and may perform further monitoring to assist in that decision. Such a delay in the decision may include, for example, initially create a new entry in mapping information 212 that corresponds to the new virtual network address, and monitoring ongoing communications by computing node A to determine if both the previous virtual network address and new virtual network address continue to be used—if so, separate entries for both virtual network addresses may be maintained, and otherwise the entry for the previous virtual network address may eventually be deleted or merged with the new entry (or allowed to expire without updating it). As another alternative, rather than delaying the decision, Communication Manager module R may use other available information to determine whether the new virtual network address is intended to be a change to the previous virtual network address or instead part of a new network interface—for example, if the new virtual network address is used with the dummy hardware address previously mapped to the previous virtual network address, Communication Manager module R may assume that the new virtual network address is being used as a changed version of the previous virtual network address.

In addition, if Communication Manager module R detects a new virtual network address being used by computing node A and notifies System Manager module 290 accordingly, System Manager module 290 may then use updated information 292 as part of subsequent interactions 240 with Communication Manager module S to determine whether to authorize the communication 230-3 after it is received by Communication Manager module S. Similarly, if System Manager module 290 instead previously obtains the new virtual network address information for computing node A via an explicit notification as previously discussed, the System Manager module 290 may similarly update and use the provisioning information 292 as part of such interactions 240, as well as interactions 225. Upon such an explicit notification, System Manager module 290 may further proactively update some or all Communication Manager modules of such updated information for computing node A. For example, by tracking current and/or recent communication sessions, System Manager module 290 may identify that Communication Manager modules R and/or S are to be updated, and send corresponding updated mapping information. Furthermore, if the System Manager module 290 further tracks time-to-live ("TTL") or other expiration information for entries in mapping information 212 and 262, the System Manager module 290 may use such expiration information as part of its proactive updates to Communication Manager modules, such as to determine not to update a particular Communication Manager module based on its entries corresponding to computing node A having previously expired or having an imminent expiration—in such situations, that Communication Manager module may be expected to initiate its own update of the mapping information for computing node A (e.g., as triggered by the expiration of the previous mapping information entry for computing node A, when triggered by a subsequent communication that causes that mapping information entry for computing node A to be used, etc.).

In addition, an update of such mapping information to some or all Communication Manager modules may be performed in various manners in various embodiments, such as by individual communications sent to each of those Communication Manager modules, by performing a multicast or broadcast to all of those Communication Manager modules with the updated information (or with an indication to expire the previous information, or with an indication to initiate an interaction with the System Manager module to obtain the updated information), etc.

FIG. 2C illustrates a further example of managing ongoing communications for the virtual network described with respect to FIGS. 2A and 2B, but with those communications being managed to support a move of computing node G 255a, such as a move that occurs after the activities previously described in FIGS. 2A and 2B have been completed. In particular, FIG. 2C illustrates computing node A, Communication Manager modules R and S, System Manager module 290, and interconnection network 250 in a manner similar to that shown in FIGS. 2A and 2B. However, FIG. 2C further illustrates a new Communication Manager module T 215 that manages computing nodes 235 in a physical network location distinct from that of previous computing node G 255a.

In the example of FIG. 2C, a modification to the virtual network has occurred that involves a logical move of previous computing node G 255a to new computing node 235a, and the previous computing node G 255a is illustrated as no longer being present or used (e.g., the host physical computing system that provided previous computing node G 255a is now idle, or has failed, or is now in use to provide a new other computing node for another virtual network). As is indicated, new computing node G 235a continues to use the same virtual network address "10.0.0.3" as the previous computing node G 255a, and the mapping information 217 maintained by Communication Manager module T 215 contains mapping information corresponding to new computing node G 235a. Similarly, the mapping information 212 maintained by Communication Manager module R 210, and optionally the mapping information 262 maintained by Communication Manager module S 260, have been updated to reflect the move of computing node G, as discussed below.

The move of computing node G may be prompted in various manners, such as based on an automated determination by the ONM system as previously discussed, or instead as requested by a user. In this example, a user 285 who is associated with computing node G and the virtual network to which it belongs may have optionally initiated the move of computing node G by performing one or more interactive or programmatic interactions 287 with the ONM System Manager module 290, such as by requesting a new computing node with specified capabilities but without otherwise being aware of the specific location or identity of new computing node G 235a. If the determination to move computing node G is instead performed automatically by the ONM System Manager module 290, the computing node move may be performed transparently to the other computing nodes of the virtual local network and/or to the user on whose behalf the virtual network is provided.

After the determination to move previous computing node G 255a to new computing node G 235a is made, whether automatically or as prompted by user 285, the System Manager module 290 takes various actions in this example to support the computing node move. In particular, System Manager module 290 in this example performs one or more interactions 229a with previous computing node G 255a and one or more interactions 299b with new computing node G 235a to facilitate the computing node move, such as to initiate the execution of appropriate software on and provide appropriate data to new computing node G 235a, and/or to initiate the termination of software on and retrieve appropriate data from previous computing node G 255a. In addition, in some embodiments, the initiation of a program executing on a particular computing node and/or the move of a computing node may include one or more interactions by the System Manager module 290 with the associated Communication Manager module(s) that manage those computing nodes, such as if the computing nodes are virtual machines and the associated Communication Manager module(s) are virtual machine hypervisor monitors on the same host computing system with those virtual machine computing nodes.

In addition, the System Manager module 290 performs various interactions 227 in this example to propagate updated mapping information for computing node G to some or all Communication Manager modules to reflect the computing node move. For example, the System Manager module 290 may send a message 227-8 to Communication Manager module R to update previously stored mapping information 212 for computing node G, so as to now correspond to Communication Manager module T rather than Communication Manager module S. In addition, the System Manager module 290 may send a message 227-9 to Communication Manager module T to provide new mapping information 217 for new computing node G 235*a*, or instead Communication Manager module T may generate the mapping information 217 over time in response to communications to and from the associated managed computing nodes 235 (e.g., based on interactions with System Manager module 290, as discussed in greater detail previously with respect to Communication Manager modules R and S). The System Manager module 290 may also optionally send a message 227-10 to Communication Manager module S to update previously stored mapping information 262 for previous computing node G 255*a*, such as to remove information specific to computing node G 255*a* and/or to update previously stored information for computing node G to now correspond to Communication Manager module T rather than Communication Manager module S.

After the computing node move is completed and mapping information 212 is updated, computing node A initiates the sending of a new communication 222-*g* that is intended for computing node G, such as by specifying a destination network address of "10.0.0.3" for the new communication and a destination hardware address for the new communication that is the dummy hardware address previously provided to computing node A by Communication Manager module R in message 220-*b* (which was also previously used by computing node A in sending communication 220-*c* to previous computing node G 255*a*). However, when Communication Manager module R receives the new communication 222-*g*, rather than forwarding it to Communication Manager module S as was done for prior communication 220-*c*, Communication Manager module R uses the updated mapping information 212 to determine to forward new communication 222-*g* to Communication Manager module T to reflect the location of new computing node G 235*a*. In particular, in a manner similar to that for previous communication 220-*c* but instead using the updated mapping information 212, Communication Manager module R determines to use the substrate network address "::0C:05:<Z-identifier>10.0.0.3" corresponding to Communication Manager module T for forwarding the new communication over the substrate interconnection network 250. Thus, Communication Manager module R creates a new IPv6 header that includes that new substrate network address as the destination address, and that includes other information similar to that previously discussed with respect to communication 220-*c* and 230-3. The Communication Manager module R then creates new communication 232-11 by modifying communication 222-*g* so as to replace the initial IPv4 header with the new IPv6 header, including populating the new IPv6 header with other information as appropriate for the new communication (e.g., payload length, traffic class packet priority, etc.). As previously noted, in at least some embodiments, before forwarding communication 232-11 to Communication Manager module T, Communication Manager module R may also perform one or more actions to determine that communication 222-*g* is authorized to be forwarded to computing node G as communication 232-11.

After Communication Manager module R forwards the modified communication 232-11 to the interconnection network 250, the interconnection network uses the physical IPv6 destination network address of the communication to route the communication to Communication Manager module T. When Communication Manager module T receives communication 232-11 via the interconnection network 250, it performs actions similar to those of Communication Manager module S with respect to communication 230-3. In particular, the Communication Manager module T may verify that communication 232-11 is legitimate and authorized to be forwarded to new computing node G, then modifies communication 232-11 as appropriate for the virtual network, and forwards the modified communication to new computing node G 235*a*. To modify communication 232-11, Communication Manager module T retrieves information from mapping information 217, and then creates a new communication 247-*h* by modifying communication 232-11 so as to replace the prior IPv6 header with a new IPv4 header, such as in a manner similar to that previously described for Communication Manager module S and previously sent communication 230-3.

In this manner, the illustrated embodiment of the ONM system may take various actions to manage the communications for the virtual network in such a manner as to support the move of computing node G, in a manner that is transparent to the computing nodes of the virtual network.

In addition, as previously noted, it is possible that in some situations a communication that is intended for computing node G (e.g., communication 222-*g*) may be erroneously forwarded to Communication Manager module S rather than Communication Manager module T, such as if the sending Communication Manager module does not have updated information to reflect the move of computing node G. If so, in at least some such embodiments, Communication Manager module S may further support the move of computing node G by forwarding such a received communication on to Communication Manager module T, such as based on using updated mapping information 262 that is received from the System Manager module 290 in message 227-10. Furthermore, in at least some such situations, the Communication Manager module S may also take additional actions to correct the erroneous mapping information used by the sending Communication Manager module, such as by sending a response message to the sending Communication Manager module to indicate that the mapping information used by the sending Communication Manager module is invalid, and/or by notifying the System Manager module 290 of that erroneous mapping information for correction. In other embodiments, the Communication Manager module S may instead take other actions, such as to return an error message to the sending Communication Manager module in response to the received communication, which may instead prompt the sending Communication Manager module to correct the erroneous mapping information and then re-forward the communication directly to Communication Manager module T.

As previously noted, a determination to move a computing node may be made in various ways and for various reasons. For example, the move may reflect problems related to the current computing node, such as failure of the current computing node, failure of network access to the current computing node, over-utilization of the current computing node, over-utilization of network bandwidth by the current computing node (whether alone or in combination with one or more other related computing nodes), etc. As other example, the move may be based at least in part on different capabilities or usage costs of a new computing node, on a geographical or network location of the current computing node or new computing node, etc. In other situations, the move may be performed to accommodate another use of the current computing node (e.g., a higher-priority use), or instead to consolidate computing nodes that are in use on a limited number of host physical computing systems or in a common location (e.g., to enable the current computing node to be shut down for reasons such as maintenance, energy conservation, etc.). In addition, the selection of a particular new computing node for use in a computing node move (or of an initial selection of a particular computing node for use in a virtual network) may be performed in various manners in various embodiments. For example, in some embodiments the selection of a computing node may be based at least in part on a geographical and/or network location of the computing node, such as an absolute location, or instead a location relative to one or more other computing resources of interest (e.g., other computing nodes of the same virtual network, storage resources to be used by the computing node, etc.), such as within a minimum and/or maximum specified geographical distance or other degree of proximity to an indicated other computing resource or other location. In addition, in some embodiments, factors used when selecting a computing node may be not be based on location, such as to include one or more of the following: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; etc.

Various other types of actions than those discussed with respect to FIGS. 2A-2C may be performed in other embodiments, including for types of network addressing protocols other than IPv4 and IPv6.

Figure 2D:
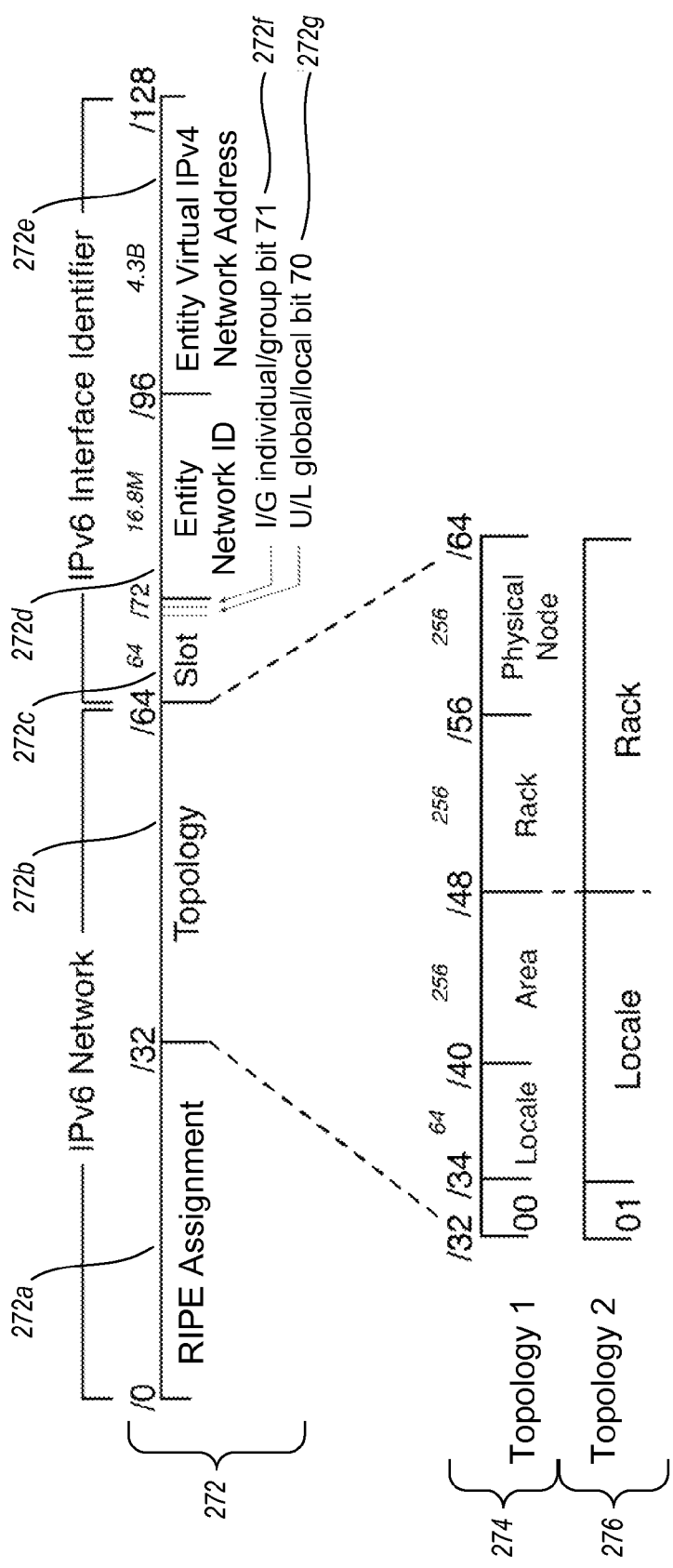
FIG. 2D illustrates an example of configuring underlying substrate network addresses so as to enable embedding of virtual network addresses for an overlay network.

FIG. 2D illustrates an example IPv6 physical substrate network address configuration 272 for use with the described techniques in some embodiments, with the example network address being configured so as to embed a virtual network address and other information in the substrate network address so as to enable an overlay virtual network over the substrate network. As previously discussed, this example IPv6 network address configuration uses the 128-bit network address space to store various information, with the initial 64 bits storing an IPv6 network portion of the address, and with the subsequent 64 bits storing an interface identifier (or "host") portion of the address.

In this example, the initial 64-bit network portion of the IPv6 address includes a 32-bit identifier 272a for bits 0 through 31 that corresponds to a corporate or other organization identifier assigned to such an organization by an Internet registry operator on behalf of the Internet Assigned Numbers Authority (in this example, based on an assignment from the Regional Internet Registry RIPE NNC, or Réseaux IP Européens Network Coordination Centre). For example, in some embodiments, an organization that operates an embodiment of the ONM system or another organization that uses the described techniques may have an associated identifier 272a. The initial 64-bit network portion of the address also includes a 32-bit group of information 272b in this example that corresponds to topology of a group of multiple computing nodes (e.g., a sub-network or other network portion) provided on behalf of the group whose identifier is indicated in information 272a. As previously discussed, in at least some embodiments, the initial 64-bit network portion of the address represents a partial network address for the substrate network that corresponds to a location of multiple related computing nodes, such as a sub-network or other portion of the substrate network. In particular, the initial 64-bit network address portion in at least some embodiments corresponds to a particular communication manager module that represents multiple associated computing nodes being managed by the communication manager module, such as based on the communication manager module managing the range of network addresses corresponding to some or all of the 64-bit interface identifier address portion in order to represent the various managed computing nodes. In other embodiments, the partial network address may be represented with a different number of bits (e.g., 72) and/or using a part of the address other than a prefix.

The 32-bit group of topology information 272b may represent various information in various ways in different embodiments, with topology information groups 274 and 276 showing two alternative example configurations of topology information. In particular, in the examples of 274 and 276, the first two bits (bits 32 and 33 of the overall IPv6 address) indicate a particular version of the topology information, such that the meaning of the remaining 30 bits may change over time or in different situations. With respect to example 274, various bits as shown each indicate different geographical locales, geographic areas within the locales, computer racks within the geographic areas, and physical computing system nodes within the computer racks. In this example, the 6 bits for the locale information may represent 64 unique values, the 8 bits for the area information may represent 256 unique values for each locale value, the 8 bits for the rack information may represent 256 unique values for each area value, and the 8 bits for the physical computing system node information may represent 256 unique values for each rack value. Conversely, with respect to example 276, only locale and rack information is shown, but each have additional bits in order to represent those types of information, such as to have 16,384 unique locale values using its 14 bits, and to have 65,536 unique rack values using its 16 bits for each locale value. It will be appreciated that topology information may be represented in other manners in other embodiments.

In this example, the 64-bit interface identifier portion of the IPv6 address is configured to store several types of information, including a 6-bit identifier 272c that corresponds to a particular computing node slot (e.g., a particular virtual machine computing node on a particular physical computing system corresponding to the initial 64-bit network portion of the IPv6 address), two 1-bit identifiers 272f and 272g, a 24-bit identifier 272d to embed an entity network identifier (e.g., to reference a particular virtual network), and a 32-bit identifier 272e to embed an IPv4 network address (e.g., a virtual network address). The 6 bits for the slot identifier may represent approximately 64 unique values, the 24 bits for the embedded entity network identifier may represent approximately 16.8 million unique values, and the 32 bits for the embedded IPv4 network address may represent approximately 4.3 billion unique values. In this example, the 1-bit identifier 272g (bit 70 of the IPv6 address) represents a U/L global/local bit that in some embodiments may indicate whether the address is globally administered or locally administered, and the 1-bit identifier 272f (bit 71 of the IPv6 address) represents an I/G individual/group bit that in some embodiments may indicate whether the address corresponds to a single computing node or to a group of multiple computing nodes (e.g., as part of a broadcast or multicast). In at least some embodiments, the I/G bit is set to zero, and the U/L bit is set to one when virtual forwarding of the corresponding communication is being used, such as for use in virtual subnetting via phantom computing node routers and/or to indicate that an incoming communication with such a destination address be delivered to a computing node corresponding to the value of the 6-bit slot identifier rather than a computing node corresponding to the values of the 32-bit IPv4 embedded network address and 24-bit entity network identifier. It will be appreciated that the interface identifier information may be represented in other manners in other embodiments.

As previously noted, the ONM system may in at least some embodiments establish and/or maintain virtual networks via the operation of one or more communication manager modules at the edge of one or more intermediate physical networks, such as by configuring and otherwise managing communications for the virtual networks. In some situations, a communication manager module tracks or otherwise determines the virtual networks to which the module's associated computing nodes belong (e.g., based on entities on whose behalf the virtual networks operate) as part of managing the communications for the virtual networks. The determination by a communication manager module of a corresponding virtual network for a computing node may be performed in various ways in various embodiments, such as by interacting with a system manager module that provides that information, by tracking software programs executed on such computing nodes, by tracking entities associated with such computing nodes, etc. For example, when a particular computing node begins to execute one or more software programs on behalf of a user, and that user also has other software programs executing on other computing nodes, the new computing node executing the user's program(s) may be selected to be associated with a virtual network for the user that includes those other computing nodes. Alternatively, a user or other entity may specify a particular virtual network to which a computing node belongs, such as if the entity maintains multiple distinct virtual networks between different groups of computing nodes. In addition, in at least some embodiments, one or more system manager modules of the ONM system may facilitate configuring communications between computing nodes, such as by tracking and/or managing which computing nodes belong to which virtual networks (e.g., based on executing programs on behalf of a customer or other entity), and by providing information about actual physical substrate network addresses that correspond to virtual network addresses used for a particular virtual network (e.g., by a particular customer or other entity). The system manager module(s) and communication manager modules of an embodiment of the ONM system may also perform various actions to manage modifications to the computer networks being provided, as discussed in greater detail elsewhere.

In addition, in at least some embodiments, various information about computing nodes and virtual networks may be used by the modules of an ONM system embodiment to determine whether communications between computing nodes are authorized, such as if only authorized communications are delivered or forwarded by communication manager modules (or if unauthorized communications are handled differently from authorized communications in one or more other manners). For example, if a first computing node on a first virtual network attempts to send an outgoing communication to a second computing node on a different second virtual network, and that second virtual network (or the second computing node) has not authorized incoming communications from the first virtual network (or from the first computing node), the first computing node may not be able to even send such a communication onto the one or more intermediate substrate networks between the first and second computing nodes, due to the communication manager module associated with that first computing node blocking such an outgoing communication (e.g., by receiving the outgoing communication from the first computing node but not forwarding the outgoing communication, by preventing the first computing node from obtaining information about one or more addresses for the second computing node that would be used in sending such a communication, etc.). In addition, if an unauthorized communication is sent over an intermediate substrate network to an intended destination computing node (e.g., based on a malicious user being able to gain access to the substrate network), a communication manager module that manages communications for the destination computing node may identify and prevent the unauthorized communication from being forwarded to the destination node.

In at least some embodiments, detection and/or prevention of unauthorized communications may be based at least in part on a topology of the one or more intermediate substrate networks on which a virtual network is overlaid. In particular, in at least some embodiments, each computing node that is part of a virtual network is managed by an associated communication manager module. As described in greater detail with respect to FIGS. 2A-2D and elsewhere, in at least some such embodiments, the physical network address used for such a computing node for communications over the substrate network includes an indication of the computing node's virtual network address, and includes a partial network address for the substrate network that corresponds to a location of the computing node's associated communication manager module (e.g., a sub-network, or "subnet," or other portion of the substrate network for which the communication manager module manages communications). Thus, in order for a malicious user to correctly construct a valid physical substrate network address for a computing node that is part of a virtual network, the malicious user would need to gain access to information about the virtual network to which the computing node belongs, to gain access to information about the topology of the computing node's physical substrate network location in order to determine the partial network address for the associated communication manager module, and to determine how to use that information to construct the physical substrate network address. The validity of constructed physical substrate network addresses may be checked in various ways, such as by identifying a computing node to which a virtual address embedded in a constructed physical network address corresponds, and verifying that a location of that identified computing node corresponds to one of the computing nodes in the portion of the network that corresponds to the partial network address (e.g., one of the computing nodes managed by a communication manager module to which the partial network address corresponds). In addition, the validity of constructed physical network addresses may be checked at various times, such as by a communication manager module that receives an incoming communication intended for a destination computing node (e.g., to verify that the source physical network address is valid), by a system manager module that receives a message purportedly from a communication manager module on behalf of an indicated managed computing node (e.g., a message to request a physical network address for an intended destination computing node of interest), etc. Furthermore, if a substrate network address for a particular computing node is obtained or determined by an unauthorized user, the ONM system may move the computing node and thus change the associated substrate network address that corresponds to the moved computing node.

As previously noted, in some embodiments, a program execution service executes third-party customers' programs using multiple physical computing systems (e.g., in one or more data centers) that each host multiple virtual machines, with each virtual machine being able to execute one or more programs for a customer. In some such embodiments, customers may provide programs to be executed to the program execution service, and may reserve execution time and other resources on physical or virtual hardware facilities provided by the program execution service. In addition, customers and/or the program execution service may define virtual networks that will be used by the program execution service for computing nodes of the customer, so as to transparently provide computing nodes of a virtual network with the appearance of operating on a dedicated physical network. In addition, in some embodiments, a virtual network that is managed by an embodiment of the ONM system may be a configured computer network provided by a configurable network service. In some such embodiments, customers or other users may specify various types of configuration information for their provided configured computer networks, such as network topology information and/or network access constraints for the provided computer network, and may interact from one or more remote locations with their provided configured computer networks.

Figure 3:
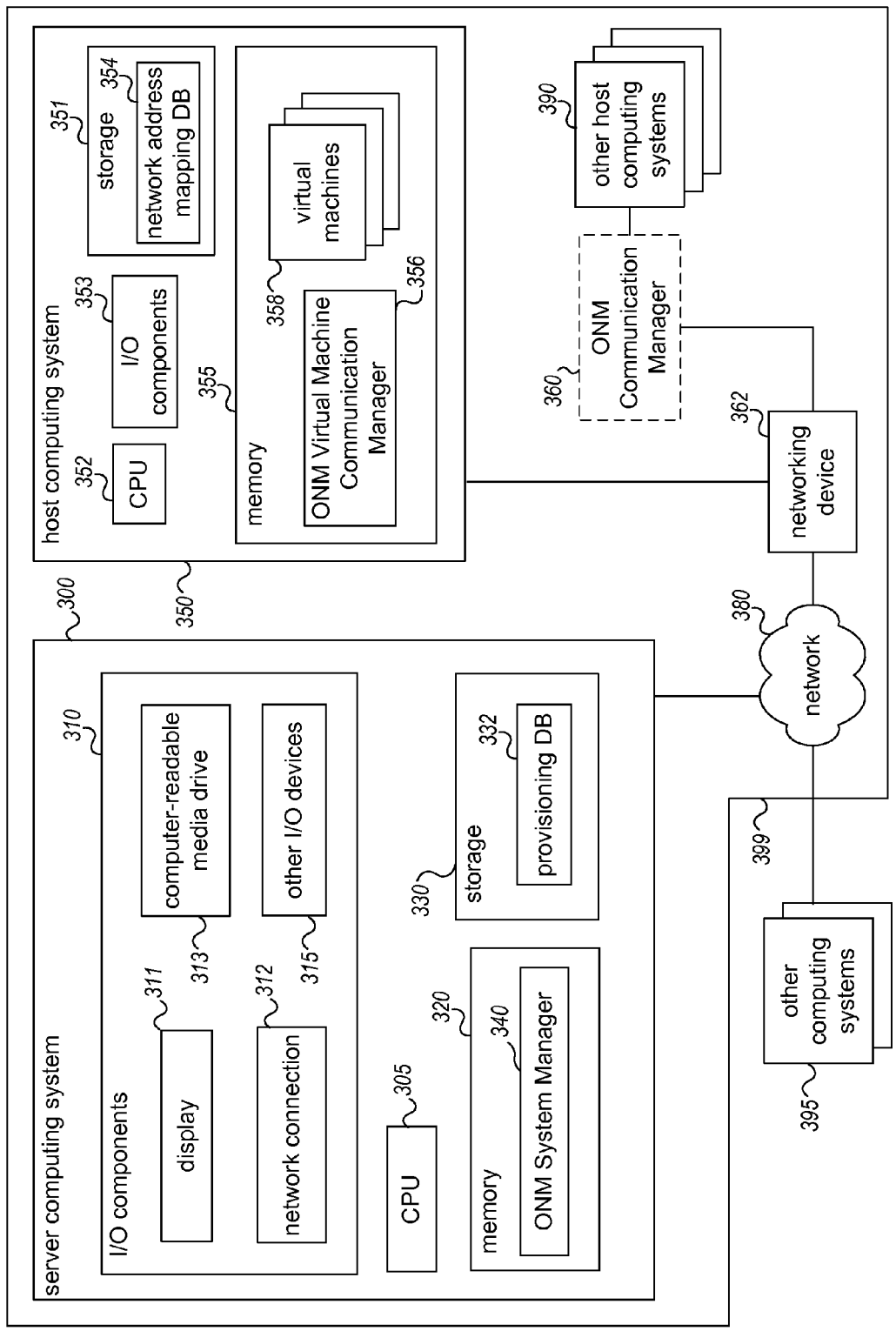
FIG. 3 is a block diagram illustrating example computing systems suitable for executing an embodiment of a system for managing communications between computing nodes.

FIG. 3 is a block diagram illustrating example computing systems suitable for executing an embodiment of a system for managing communications between computing nodes. In particular, FIG. 3 illustrates a group 399 of computing systems and inter-network(s), such as a data center or other group of co-located computing nodes. In some embodiments, some or all of the computing systems of the group 399 may be used by an embodiment of the ONM system to provide virtual networks to users or other entities. The group 399 includes a server computing system 300, a host computing system 350 capable of executing one or more virtual machines, other host computing systems 390 that are similar to host computing system 350, and an optional Communication Manager module 360 that manages host computing systems 390 and that executes on one of the computing systems 390 or on another computing system (not shown). The system manager computing system 300 and host computing systems 350 and 390 are connected to one another via an internal network 380, which includes a networking device 362 and other networking devices (not shown). The network 380 may be an interconnection network that joins multiple disparate physical networks (not shown) for the group 399 and possibly provides access to external networks (not shown) and/or systems, such as other computing systems 395. In the illustrated example, the networking device 362 provides a gateway between the network 380 and host computing systems 350 and 390. In some embodiments, networking device 362 may, for example, be a router or a bridge.

The computing system 300 operates to configure and manage virtual networks within the group 399, as well as to provide other functions (e.g., the provisioning, initialization, and execution of programs on computing nodes). The computing system 300 includes a CPU 305, various I/O components 310, storage 330, and memory 320. The I/O components include a display 311, network connection 312, computer-readable media drive 313, and other I/O devices 315 (e.g., a mouse, keyboard, speakers, etc.).

The host computing system 350 operates to host one or more virtual machines, such as for use as computing nodes in virtual networks (e.g., computing nodes that execute programs on behalf of various users). The host computing system 350 includes a CPU 352, various I/O components 353, storage 351, and memory 355. While not illustrated here, the I/O components 353 may include similar components to those of I/O components 310. A virtual machine Communication Manager module 356 and one or more virtual machines 358 are executing in the memory 355, with the module 356 managing communications for the associated virtual machine computing nodes 358. The Communication Manager module 356 maintains various mapping information 354 on storage related to the computing nodes 358 and other computing nodes, such as in a manner similar to mapping information 212 and 262 of FIGS. 2A-2B. The structure of the other host computing systems 390 may be similar to that of host computing system 350, or instead some or all of the host computing systems 350 and 390 may act directly as computing nodes by executing programs without using hosted virtual machines. In a typical arrangement, the group 399 may include hundreds or thousands of host computing systems such as those illustrated here, organized into a large number of distinct physical networks.

An embodiment of a System Manager module 340 is executing in memory 320 of the computing system 300. In some embodiments, the System Manager 340 may receive an indication of multiple computing nodes to be used as part of a virtual network (e.g., one or more virtual machine computing nodes on host computing system 350 or one or more computing nodes using one of the host computing systems 390), and in some situations may select the particular computing node(s) for the virtual network. In some cases, information about the structure and/or membership of various virtual networks may be stored in the provisioning database 332 on storage 330 by the module 340, and provided to the Communication Manager modules at various times.

As discussed in greater detail elsewhere, the Communication Manager modules 356 and 360 (and other Communication Manager modules, not shown, that manage other associated computing nodes, not shown) and the System Manager module 340 may interact in various ways to manage communications between computing nodes. Such interactions may, for example, enable the computing nodes 358 and/or other computing nodes to inter-communicate over virtual networks without any special configuration of the computing nodes, by overlaying the virtual networks over network 380 and optionally one or more external networks (not shown) without any special configuration of networking device 362 or other networking devices (not shown), and without encapsulation of communications.

It will be appreciated that computing systems 300, 350, 390, and 395, and networking device 362, are merely illustrative and are not intended to limit the scope of the present invention. For example, computing systems 300 and/or 350 may be connected to other devices that are not illustrated, including through one or more networks external to the group 399, such as the Internet or via the World Wide Web ("Web"). More generally, a computing node or other computing system may comprise any combination of hardware or software that can interact and perform the described types of functionality, including without limitation desktop or other computers, database servers, network storage devices and other network devices, PDAs, cellphones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

It will also be appreciated that, while various items are illustrated as being stored in memory or on storage while being used, these items or portions of them can be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other manners, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4A:
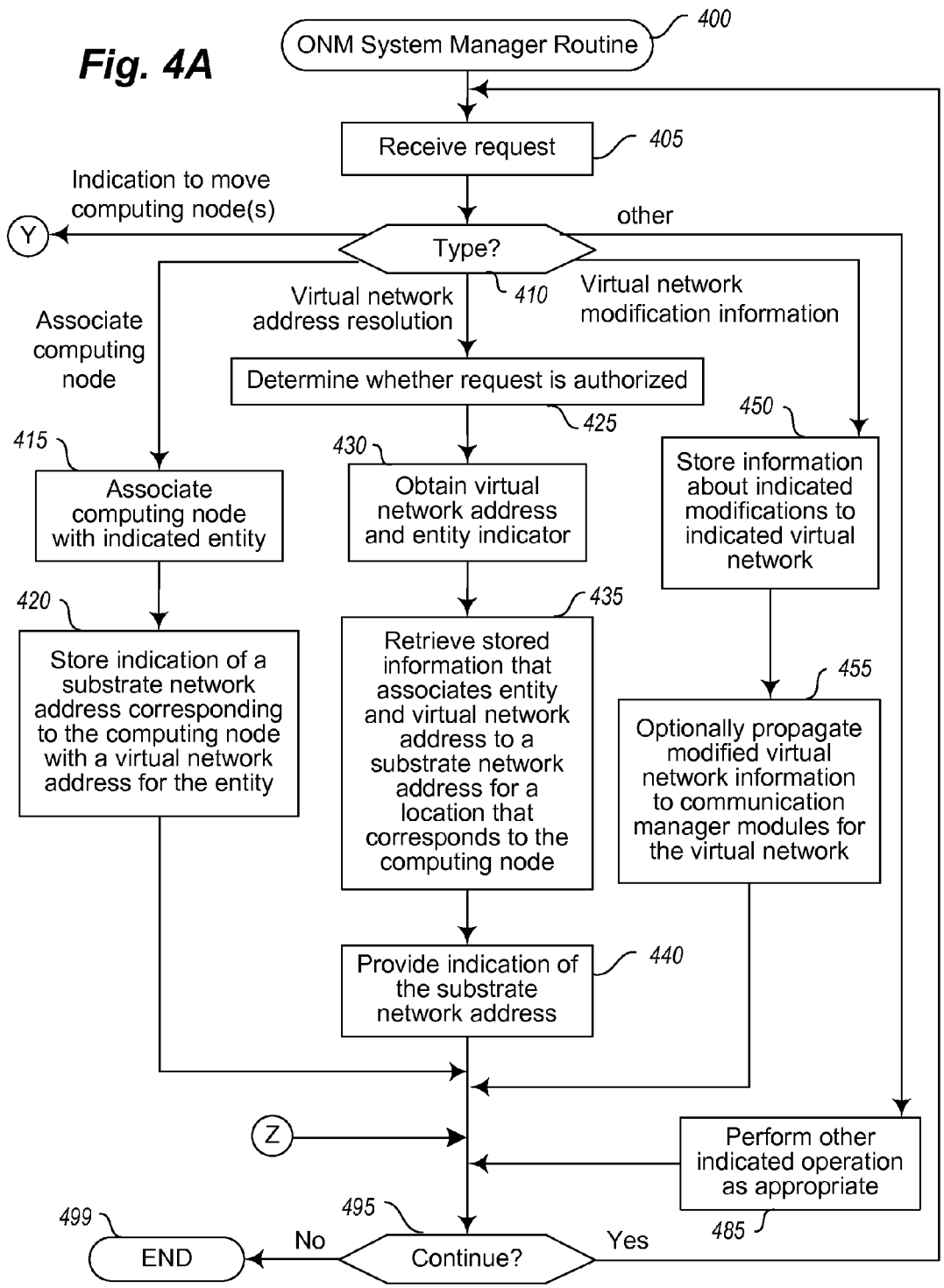
FIGS. 4A-4B illustrate a flow diagram of an example embodiment of an ONM System Manager routine.
Figure 4B:
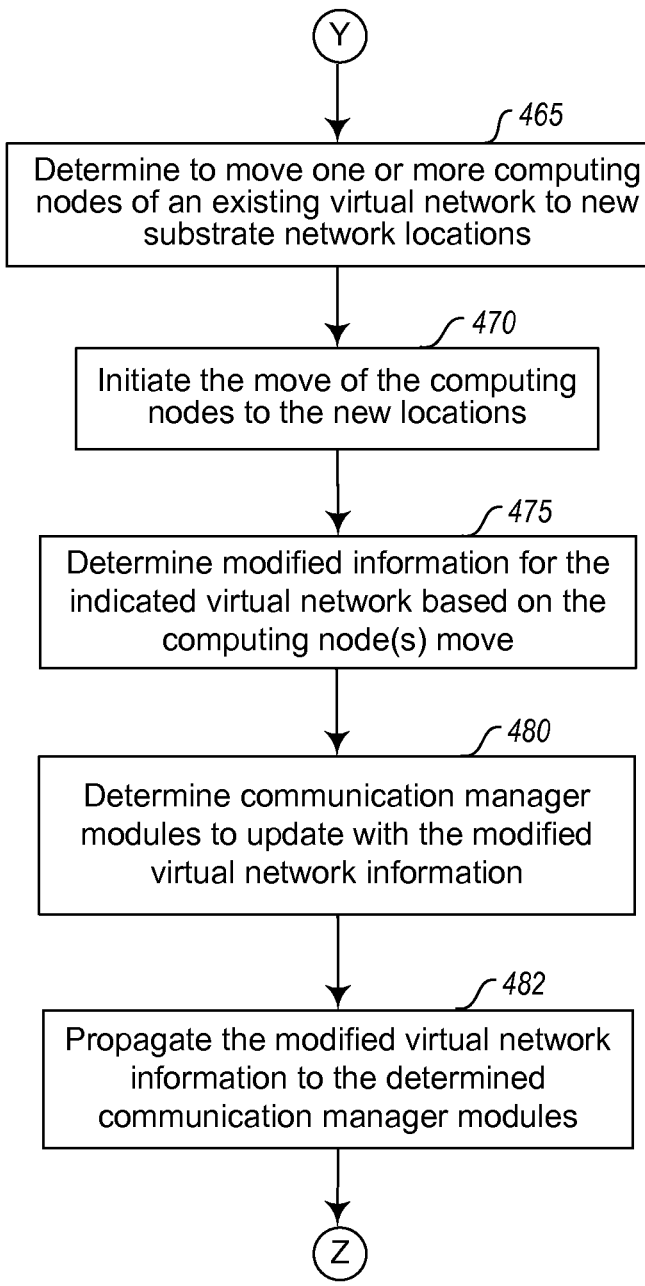

FIGS. 4A-4B are a flowchart of an example embodiment of an ONM System Manager routine 400. The routine may be provided by, for example, execution of the system manager module 110 of FIG. 1, the system manager module 290 of FIGS. 2A-2C, and/or the system manager module 340 of FIG. 3, such as to assist in managing communications between multiple computing nodes across one or more intermediate networks, including to manage communications so as to support computing node moves and other virtual network modifications, as well as to perform other types of management operations in some situations. In at least some embodiments, the routine may be provided as part of a system that configures communications for multiple different entities across a common intermediate network, with the communications configured so as to enable each computing node to transparently communicate with other associated computing nodes using a private virtual local network that is specific to that entity. Furthermore, the routine may facilitate preventing unauthorized communications from being provided to destination computing nodes, such as by assisting Communication Manager modules with determinations of whether communications are authorized.

In the illustrated embodiment, the routine begins at block 405, where a request is received. The routine continues to block 410 to determine the type of request. If it is determined that the type of request is to associate one or more computing nodes with a particular indicated entity, such as if those computing nodes are to be part of a virtual network for the entity (e.g., are executing or are to execute one or more programs on behalf of that entity), the routine continues to block 415 to associate those computing nodes with that indicated entity. In some embodiments, the routine may further determine the one or more computing nodes to be associated with the indicated entity, such as based on information provided by the indicated entity, while in other embodiments the selection of such computing nodes and/or execution of appropriate programs on those computing nodes may be performed in other ways. In addition, as discussed in greater detail elsewhere, in some embodiments one or more of the computing nodes may each be a virtual machine that is hosted by one or more physical computing systems. The routine then continues to block 420 to store an indication of the computing node(s) and their association with the indicated entity and virtual network. In particular, in the illustrated embodiment the routine stores an indication of a physical substrate network address corresponding to the computing node, a virtual network address used by the entity for the computing node as part of the virtual network, and an indication of the associated entity. As discussed in greater detail elsewhere, the physical substrate network address corresponding to the computing node may in some embodiments be a substrate network address specific to that single computing node, while in other embodiments may instead refer to a sub-network or other group of multiple computing nodes, such as may be managed by an associated Communication Manager module. Furthermore, in situations in which a particular entity has multiple distinct virtual networks, the routine may receive an indication of or otherwise determine the one or more virtual networks with which the computing node is associated.

If it is instead determined in block 410 that the type of received request is a request for address resolution for a virtual network address of a computing node, such as from a communication manager module on behalf of another managed computing node, the routine continues instead to block 425, where it determines whether the request is authorized in one or more ways, such as based on whether the managed computing node on whose behalf the request is made is authorized to send communications to the computing node whose virtual network address resolution is requested (e.g., based on the virtual network(s) to which the two computing nodes belong), based on whether the managed computing node on whose behalf the request is made is a valid computing node that is currently part of a configured virtual network, and/or based on whether the request is received from the communication manager module that actually manages the indicated computing node on whose behalf the request is made. If the request is determined to be authorized, the routine continues to block 430, where it obtains a virtual network address of interest and an entity network identifier or other indicator of the entity (e.g., a unique numeric or alphanumeric label), such as included with the request received in block 405. The routine then continues to block 435 to retrieve stored information that associates that virtual network address for the virtual network corresponding to that entity network identifier to a physical substrate network address for a network location that corresponds to the computing node, such as may be previously stored with respect to block 420. After block 435, the routine continues to 440 to provide an indication of the physical substrate network address to the requester. While not illustrated here, if the determination in block 425 determines that the request is not authorized, the routine may instead not perform blocks 430-440 for that request, such as by responding with an error message to the request received in block 405 or not responding to that received request. In addition, in other embodiments the routine may perform one or more other tests to validate a received request before responding with the requested information, such as to verify that the computing node that initiated the request is authorized to receive that information.

If it is instead determined in block 410 that the received request is to update virtual network information that has been modified, such as from a communication manager module that detects a changed or new virtual network address being used by a computing node, the routine continues to block 450 to store information about the indicated modifications to the indicated virtual network. The routine then continues to block 455 to optionally propagate the virtual network modification information to some or all communication manager modules, such as all communication manager modules that support computing nodes that are part of the virtual network, some or all communication manager modules that support computing nodes that are currently or have recently participated in communicating with computing nodes that have been modified, etc.

If it is instead determined in block 410 that the received request is related to moving one or more computing nodes, such as based on an automated determination in block 485 or a request from a user, the routine continues to block 465. In block 465, the routine determines one or more existing computing nodes to each be moved to a new substrate network location, such as based on existing computing nodes indicated in the request received in block 405 or based on automatically determining existing computing nodes to move based on one or more factors, as discussed in greater detail elsewhere. After block 465, the routine continues to block 470 to initiate the move of the determined computing nodes to the determined new substrate network locations, such as to perform logical moves to new computing nodes that are automatically selected at the new substrate network locations. In block 475, the routine then determines modified information for the virtual network that corresponds to the moved computing nodes, and in block 480 optionally determines one or more communication manager modules to update with the modified virtual network information. In block 482, the routine then propagates the modified virtual network information to the determined communication manager modules, and stores the modified virtual network information for later use.

If it is instead determined in block 410 that the received request is of another type, the routine continues instead to block 485 to perform another indicated operation as appropriate. For example, in some embodiments, the routine may receive requests to update stored information about particular computing nodes, such as if a particular computing node was previously associated with a particular entity and/or virtual network but that association ends (e.g., one or more programs being executed for that entity on that computing node are terminated). The routine may also perform a variety of other actions related to managing a system of multiple computing nodes, as discussed in greater detail elsewhere, including automatically determining to initiate moves of particular computing nodes. In addition, while not illustrated here, in other embodiments the routine may at times perform actions of other types, such as to perform occasional housekeeping operations to review and update stored information as appropriate, such as after predefined periods of time have expired. In addition, if possible validation problems are detected, such as with respect to received address resolution requests for virtual network addresses, the routine may take various actions to signal an error and/or perform other corresponding actions as appropriate.

After blocks 420, 440, 455, 482 and 485, the routine continues to block 495 to determine whether to continue, such as until an explicit indication to terminate is received. If it is determined to continue, the routine returns to block 405, and if not continues to block 499 and ends.

Figure 5A:
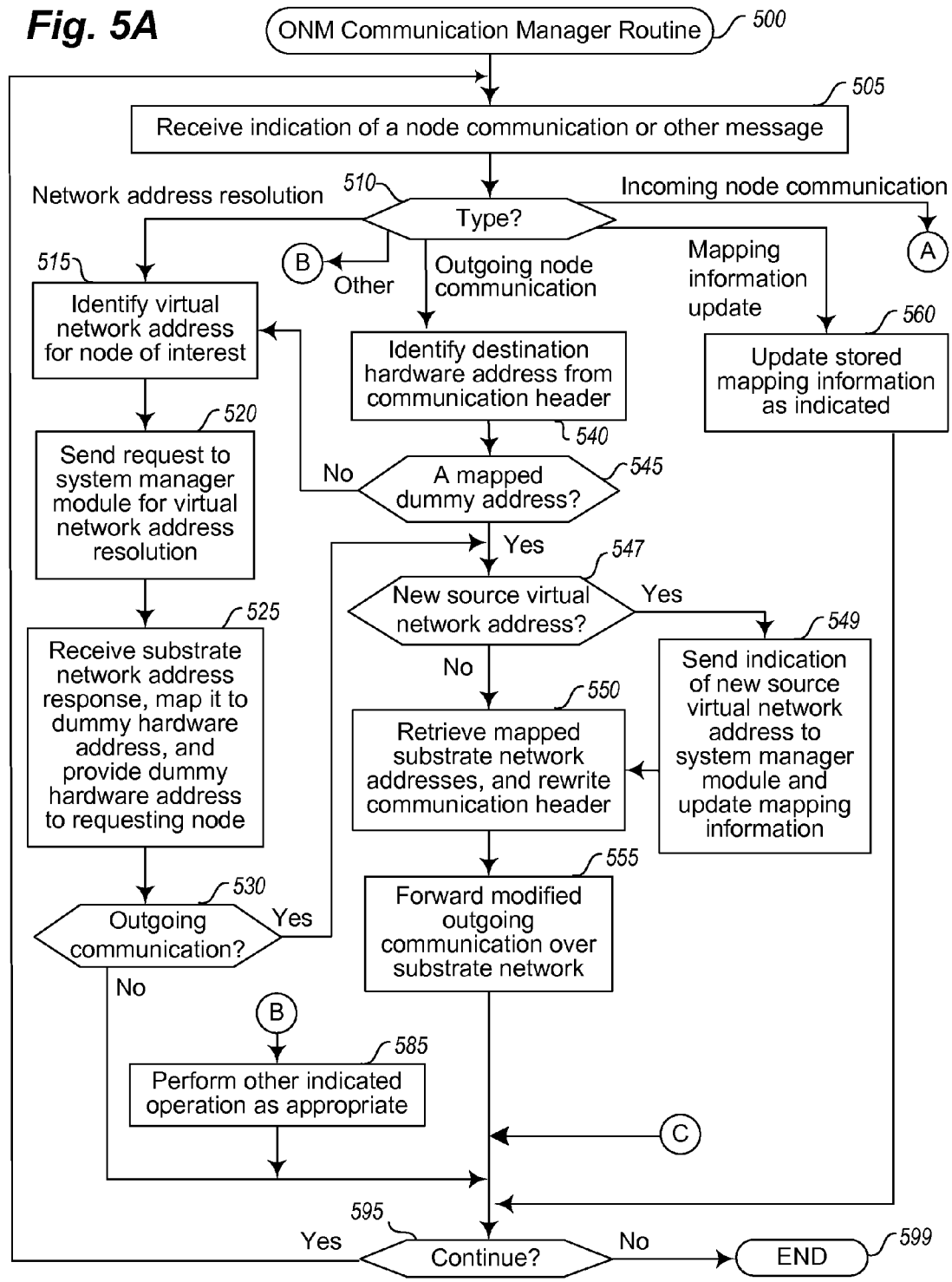
FIGS. 5A-5B illustrate a flow diagram of an example embodiment of an ONM Communication Manager routine.
Figure 5B:
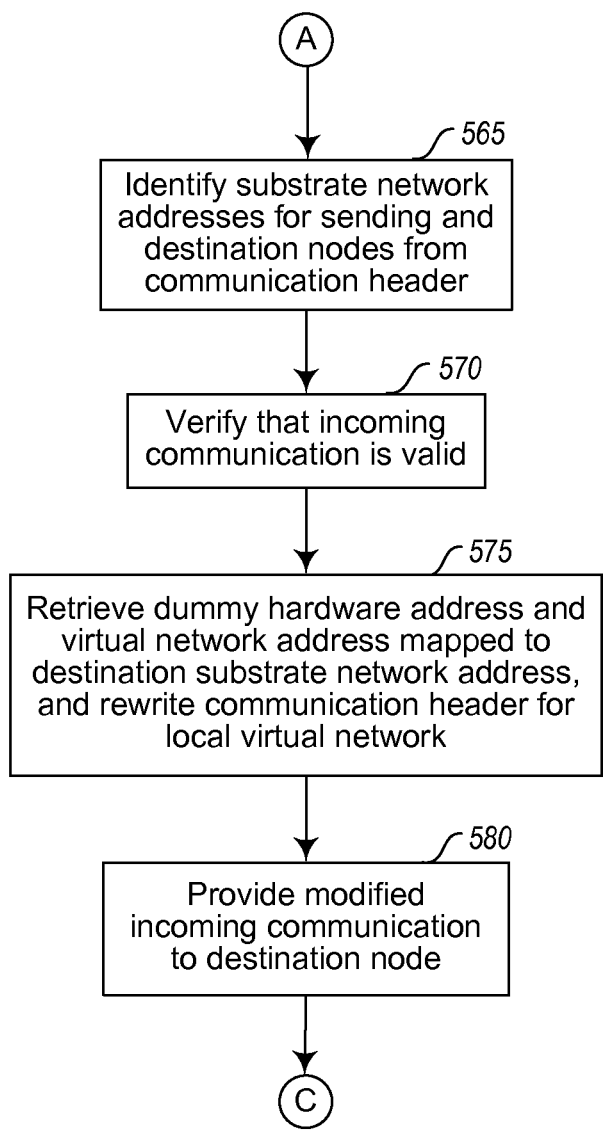

FIGS. 5A-5B are a flow diagram of an example embodiment of an ONM Communication Manager routine 500. The routine may be provided by, for example, execution of the Communication Manager modules 109a, 109c, 109d and/or 150 of FIG. 1, the Communication Manager modules 210 and/or 260 of FIGS. 2A-2C, and/or the Communication Manager modules 356 and/or 360 of FIG. 3, such as to manage communications to and from an associated group of one or more computing nodes in order to provide a private virtual network over one or more shared intermediate networks, including to determine whether to authorize communications to and/or from the managed computing nodes, and to support computing node moves and other virtual network modifications.

The routine begins at block 505, where an indication is received of a node communication or other message. The routine continues to block 510 to determine the type of communication or other message and proceed accordingly. If it is determined in block 510 that the message is a request from an associated managed computing node for network address resolution, such as an ARP request, the routine continues to block 515 to identify the virtual network address of interest indicated in the request. The routine then continues to block 520 to send a request to a system manager module for virtual network address resolution for the indicated virtual network address for the virtual network associated with the computing node that provided the request, such as discussed with respect to blocks 425-440 of FIGS. 4A-4B. As discussed in greater detail elsewhere, the routine may in some embodiments track information about virtual networks and/or entities associated with each managed computing node, while in other embodiments such information may instead be provided to the routine by the computing nodes and/or by the system manager module, or instead the system manager module may track and store that information without it being provided to and tracked by the current routine. While not illustrated here, in other embodiments and situations such address resolution requests may be handled in other manners. For example, if a computing node being managed by a particular communication manager module provides an address resolution request for another computing node that is also managed by that communication manager module, the routine may instead be able to respond to the request without interaction with the system manager module, such as based on locally stored information. In addition, while in the illustrated embodiment the received request is a request to provide a computing node's link-layer hardware address that corresponds to an indicated networking layer address, in other embodiments the address resolution request may have other forms.

In the illustrated embodiment, the routine next continues to block 525 to receive a response from the system manager module that includes a physical substrate network address, and stores information locally that maps that physical substrate network address to a unique dummy hardware address for later use by the routine (e.g., based on a dummy virtual hardware address generated by the routine or provided in the response). The routine then provides the dummy hardware address to the requesting computing node, which it will use as part of communications that it sends to the computing node with the indicated virtual network address. As discussed in greater detail elsewhere, the physical substrate network address response that is provided may in some embodiments include a physical substrate network address that is specific to the indicated computing node of interest, while in other embodiments the physical substrate network address may correspond to a sub-network or other group of multiple computing nodes to which the indicated computing node belongs, such as to correspond to another communication manager module that manages those other computing nodes. The routine then continues to block 530 to determine if blocks 515-525 were performed as part of the handling of an outgoing node communication, as discussed with respect to blocks 540-555, and if so, continues to block 547. While not illustrated here, in some embodiments the routine may instead receive an error response from the system manager module (e.g., based on the requesting computing node not being authorized to communicate with the indicated destination computing node) or no response, and if so may not send any response to the requesting computing node or may send a corresponding error message to that computing node.

If it is instead determined in block 510 that the type of communication or other message is an outgoing node communication from a computing node managed by the routine to another indicated remote destination computing node that is not managed by the routine, the routine continues to block 540 to identify the indicated hardware address for the destination computing node from the communication header. In block 545, the routine then determines whether that destination hardware address is a dummy hardware address previously mapped to a physical substrate network address corresponding to the destination computing node, such as previously discussed with respect to block 525. If not, in some embodiments the routine continues to block 515 to perform blocks 515-525 to determine such a corresponding physical network address for the outgoing node communication, while in other embodiments such actions are not performed (e.g., if the indicated hardware address is not a mapped dummy address, the routine may cause the outgoing node communication to fail, such as with an error message back to the sending node). If the indicated hardware address is a mapped dummy address, or the check is not performed, the routine continues to block 547 to determine whether the outgoing communication uses a new virtual network address for the sending computing node, such as to reflect a change to the previously used virtual network address or instead a new virtual network address as part of a new network interface for the sending computing node. If so, the routine continues to block 549 to update locally stored mapping information for the sending computing node to reflect the new virtual network address, and optionally sends a message to a system manager module to provide an indication of the virtual network modification information.

After block 549, or if it is instead determined in block 547 that a new source virtual network address is not used, the routine continues to block 550 to retrieve the physical substrate network address that is mapped to the dummy hardware address, and rewrites the communication header in accordance with a networking address protocol for one or more intermediate networks between the sending and destination computing nodes using the retrieved address. The header re-writing may further include changing other information in the new header, including changing a virtual network address for the sending computing node to be a corresponding physical substrate network address, and in at least some embodiments includes modifying the received communication without encapsulation as part of an overlay of the virtual network over the substrate one or more intermediate physical networks. In block 555, the routine then facilitates providing of the modified outgoing communication to the destination computing node, such as by initiating forwarding of the modified outgoing communication over the substrate intermediate network(s) to the destination computing node. While not illustrated here, in other embodiments various additional types of processing may be performed for outgoing node communications, such as to verify that the communications are valid or otherwise authorized in various ways (e.g., to verify that the sending computing node is authorized to send communications to the destination computing node, such as based on being associated with the same entity or part of the same virtual network, based on the sending and destination computing nodes being associated with different entities that are authorized to inter-communicate, based on the type of communication or other information specific to the communication, etc.).

If it is instead determined in block 510 that the received message is an incoming node communication for one of the managed computing nodes from an external computing node, the routine continues to block 565 to identify the physical substrate network addresses for the sending and destination computing nodes from the communication header. After block 565, the routine continues to block 570 to optionally verify that the incoming communication is valid in one or more ways. For example, the routine may determine whether the physical substrate network address for the sending communication node is actually mapped to a computing node that corresponds to the source physical substrate network address location, such as based on interactions with a system manager module and/or based on other information previously obtained and stored by the routine. In addition, the routine may determine whether the physical substrate network address for the destination communication node corresponds to an actual managed computing node. While not illustrated here, if an incoming communication is determined to not be valid, the routine may take various actions not shown, such as to generate one or more errors and perform associated processing and/or drop the incoming communication without forwarding it to the indicated destination node. For example, if the incoming communication indicates a destination network address that does not correspond to a current managed computing node, the routine may drop the incoming communication and/or initiate an error message, although in some embodiments such error messages are not sent to the sending computing node, or other actions may be taken to support forwarding communications to a moved computing node that was previously supported by the routine. If the indicated destination network address corresponds to a computing node that was recently managed but is not currently managed for other reasons (e.g., due to that computing node no longer being associated with the indicated virtual network, such as due to no longer executing one or more programs on behalf of a corresponding entity), the routine may provide an indication to the sending computing node that the destination computing node is no longer available.

In the illustrated embodiment, after block 570, the routine continues to block 575 to retrieve the dummy hardware address and the virtual network address that are mapped to the physical destination substrate network address, and to rewrite the communication header for the virtual local network so that it appears to be sent to a computing node with that virtual network address and dummy hardware address. For example, in some embodiments the destination virtual network address may be obtained from the destination physical substrate network address itself, such as from a subset of the bits of the destination physical substrate network address. In addition, the dummy destination hardware address may have previously been mapped to the physical destination substrate network address, such as previously discussed with respect to block 525. In situations in which such prior mapping has not occurred, the routine may instead perform blocks 515-525 to obtain such information. The routine may similarly rewrite the communication header for the virtual local network so that it appears to be sent from a computing node with a source virtual network address and dummy source hardware address corresponding to the sending computing node. After block 575, the routine continues to block 580 to facilitate providing of the modified incoming communication to the destination computing node, such as by initiating forwarding of the modified incoming communication to the destination node.

If it is instead determined in block 510 that a mapping information update is received from the system manager module (or optionally from another source, such as another communication manager module), the routine continues to block 560 to update locally stored mapping information to correspond to the mapping information update.

If it is instead determined in block 510 that a message of another type is received, the routine continues to block 585 to perform another indicated operation as appropriate, such as to store information about entities associated with particular computing nodes, update previously mapped or stored information to reflect changes with respect to computing nodes that are being managed or to remote computing nodes, etc.

After blocks 555, 565, 580, or 585, or if it is instead determined in block 530 that the processing is not being performed with respect to an outgoing communication, the routine continues to block 595 to determine whether to continue, such as until an explicit indication to terminate is received. If it is determined to continue, the routine returns to block 505, and if not continues to block 599 and ends.

In addition, various embodiments may provide mechanisms for customer users and other entities to interact with an embodiment of the system manager module for purpose of configuring computing nodes and their communications. For example, some embodiments may provide an interactive console (e.g. a client application program providing an interactive user interface, a Web browser-based interface, etc.) from which users can manage the creation or deletion of virtual networks and the specification of virtual network membership, as well as more general administrative functions related to the operation and management of hosted applications (e.g., the creation or modification of user accounts; the provision of new applications; the initiation, termination, or monitoring of hosted applications; the assignment of applications to groups; the reservation of time or other system resources; etc.). In some embodiments, some or all of the functionality of an embodiment of the ONM system may be provided in exchange for fees from users or other entities, and if so the mechanisms for customer users and other entities to interact with an embodiment of the system manager module may include mechanisms for users and other entities to provide payment and payment-related information, as well as to monitor corresponding payment information. In addition, some embodiments may provide an API that allows other computing systems and programs to programmatically invoke at least some of the described functionality, such as APIs provided by libraries or class interfaces (e.g., to be invoked by programs written in C, C++, or Java) or otherwise, and/or using network service protocols such as via Web services.

Additional details related to the operation of example embodiments of a program execution service with which the described techniques may be used are available in U.S. application Ser. No. 11/394,595, filed Mar. 31, 2006 and entitled "Managing Communications Between Computing Nodes;" U.S. application Ser. No. 11/395,463, filed Mar. 31, 2006 and entitled "Managing Execution of Programs by Multiple Computing Systems;" U.S. application Ser. No. 11/692,038, filed Mar. 27, 2007 and entitled "Configuring Intercommunications Between Computing Nodes;" and U.S. application Ser. No. 12/332,214, filed Dec. 10, 2008 and entitled "Providing Access To Configurable Private Computer Networks;" each of which is incorporated herein by reference in its entirety. In addition, additional details related to the management of provided virtual networks that may be used by at least some embodiments of an ONM system are available in U.S. application Ser. No. 12/060,074, filed Mar. 31, 2008 and entitled "Configuring Communications Between Computing Nodes;" which is also incorporated herein by reference in its entirety.

It will also be appreciated that, although in some embodiments the described techniques are employed in the context of a data center housing multiple physical machines hosting virtual machines, other implementation scenarios are also possible. For example, the described techniques may be employed in the context an organization-wide network or networks operated by a business or other institution (e.g. university) for the benefit of its employees and/or members. Alternatively, the described techniques could be employed by a network service provider to improve network security, availability, and isolation. In addition, example embodiments may be employed within a data center or other context for a variety of purposes. For example, data center operators or users that sell access to hosted applications to customers may in some embodiments use the described techniques to provide network isolation between their customers' applications and data; software development teams may in some embodiments use the described techniques to provide network isolation between various environments that they use (e.g., development, build, test, deployment, production, etc.); organizations may in some embodiments use the described techniques to isolate the computing resources utilized by one personnel group or department (e.g., human resources) from the computing resources utilized by another personnel group or department (e.g., accounting); or data center operators or users that are deploying a multi-component application (e.g., a multi-tiered business application) may in some embodiments use the described techniques to provide functional decomposition and/or isolation for the various component types (e.g., Web front-ends, database servers, business rules engines, etc.). More generally, the described techniques may be used to virtualize physical networks to reflect almost any situation that would conventionally necessitate physical partitioning of distinct computing systems and/or networks.

It will also be appreciated that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

What is claimed is:

1. A non-transitory computer-readable medium having stored contents that, when executed, cause one or more computing systems of an online service to:
   provide, by the online service and on a host computer system of the online service, a hosted virtual machine for use by a customer of the online service, including to store mapping information on the host computer system to associate a first virtual internet protocol (IP) address with the hosted virtual machine, and to use the stored mapping information for providing one or more communications to the hosted virtual machine;
   receive, by the online service and after the using of the first virtual IP address, a request to use a different virtual IP address with the hosted virtual machine on the host computer system; and
   initiate, by the online service and in response to the request, and while the host computer system continues to run the hosted virtual machine for the customer, a change for the hosted virtual machine from the first virtual IP address to a different second virtual IP address, including to update the stored mapping information on the host computer system to associate the second virtual IP address with the hosted virtual machine, and to use the updated stored mapping information for providing one or more additional communications to the hosted virtual machine.

2. The non-transitory computer-readable medium of claim 1 wherein the stored contents include software instructions that, when executed, further configure the one or more computing systems to:
   provide, by the configured one or more computing systems, an interface for use by customers of the online service; and
   receive, by the configured one or more computing systems, an initial request from the customer via the provided interface before the providing of the hosted virtual machine;
   select, by the configured one or more computing systems and in response to the initial request, the hosted virtual machine for use by the customer;
   assign, by the configured one or more computing systems, the first virtual IP address to the hosted virtual machine; and
   provide, by the configured one or more computing systems, the customer with access to the hosted virtual machine,
   and wherein the initiating of the change from the first virtual IP address to the different second virtual IP address includes replacing the first virtual IP address for the hosted virtual machine with the second virtual IP address for the hosted virtual machine, and using the second virtual IP address to send the one or more additional communications to the hosted virtual machine.

3. The non-transitory computer-readable medium of claim 2 wherein the request to use the different virtual IP address is received from the customer via the provided interface and includes an indication of the second virtual IP address, and wherein the stored contents further configure the one or more computing systems to:
   forward, by the configured one or more computing systems and to the hosted virtual machine before the initiating of the change, one or more communications that are directed to the first virtual IP address; and
   forward, by the configured one or more computing systems and to the hosted virtual machine after the initiating of the change, one or more additional communications that are directed to the second virtual IP address.

4. The non-transitory computer-readable medium of claim 2 wherein the received initial request from the customer includes a request to provide a virtual computer network having multiple computing nodes to the customer, and wherein the stored contents further configure the one or more computing systems to:
   select, by the configured one or more computing systems, the hosted virtual machine as one of the multiple computing nodes, and additional virtual machines hosted by the online service for use as other of the multiple computing nodes; and
   store, by the configured one or more computing systems and before the change, additional mapping information that associates multiple additional virtual IP addresses for the provided virtual computer network with the multiple computing nodes.

5. The non-transitory computer-readable medium of claim 1 wherein the stored contents include software instructions that, when executed, further configure the one or more computing systems to, after the change:
   receive, by the configured one or more computing systems and while the hosted virtual machine is executing software for the customer, a request to move the hosted virtual machine to a new indicated location;
   select, by the configured one or more computing systems and in response to the request to move the hosted virtual machine, a second virtual machine that is hosted by the online service and is at the new indicated location;
   initiate, by the configured one or more computing systems, executing the software on the second virtual machine for the customer;
   associate, by the configured one or more computing systems, the second virtual IP address with the second virtual machine, to enable the second virtual machine to replace the hosted virtual machine; and
   forward to the second virtual machine, by the configured one or more computing systems and after the associating of the second virtual IP address with the second virtual machine, one or more communications directed to the second virtual IP address.

6. A computer-implemented method comprising:

providing, by one or more configured computing systems of an online service and on a host computer system of the online service, a virtual machine for executing software on behalf of a customer of the online service;

assigning, by the one or more configured computing systems, a first virtual internet protocol (IP) address to the provided virtual machine on the host computer system, storing mapping information on the host computer system to associate the first virtual IP address with the provided virtual machine, and using the assigned first virtual IP address and the stored mapping information to provide one or more communications to the provided virtual machine while the provided virtual machine executes the software;

receiving, by the one or more configured computing systems and while the provided virtual machine continues to execute the software, a request to change the first virtual IP address to a second virtual IP address specified by the customer; and assigning, by the one or more configured computing systems and in response to the request, the second virtual IP address to the provided virtual machine on the host computer system while the provided virtual machine is executing the software, updating the stored mapping information on the host computer system to associate the second virtual IP address with the provided virtual machine, and using the assigned second virtual IP address and the updated stored mapping information to provide one or more additional communications to the provided virtual machine while the provided virtual machine continues to execute the software.

7. The computer-implemented method of claim 6 further comprising:

providing, by the one or more configured computing systems, an interface for use by customers of the online service;

receiving, by the one or more configured computing systems and before the executing of the software on the provided virtual machine, an initial request from the customer via the provided interface; and providing, by the one or more configured computing systems and in response to the initial request, the customer with access to the provided virtual machine.

8. The computer-implemented method of claim 7 wherein the request to change the first virtual IP address is received from the customer via the provided interface.

9. The computer-implemented method of claim 7 wherein the initial request includes an indication from the customer of the software, and wherein the method further comprises, by the one or more configured computing systems, provisioning the virtual machine for the customer, and initiating executing the software on the provisioned virtual machine on behalf of the customer.

10. The computer-implemented method of claim 7 wherein the received initial request from the customer includes a request to provide to the customer a virtual computer network having multiple computing nodes, wherein the method further comprises selecting, by the one or more configured computing systems, the virtual machine as one of the multiple computing nodes and additional virtual machines hosted by the online service for use as other of the multiple computing nodes, and providing to the customer access to the additional virtual machines.

11. The computer-implemented method of claim 6 further comprising:

forwarding to the virtual machine, by the one or more configured computing systems and before the assigning of the second virtual IP address, one or more communications that are directed to the first virtual IP address; and forwarding to the virtual machine, by the one or more configured computing systems and after the assigning of the second virtual IP address, one or more additional communications that are directed to the second virtual IP address.

12. The computer-implemented method of claim 11 further comprising blocking, by the one or more configured computing systems and before the assigning of the second virtual IP address, one or more other communications that are directed to the second virtual IP address from being forwarded to any virtual machines hosted by the online service, and generating one or more errors corresponding to the one or more other communications.

13. The computer-implemented method of claim 11 further comprising blocking, by the one or more configured computing systems and after the assigning of the second virtual IP address, one or more other communications that are directed to the first virtual IP address from being forwarded to the provided virtual machine, and generating one or more errors corresponding to the one or more other communications.

14. The computer-implemented method of claim 6 further comprising:

storing, by the one or more configured computing systems and before the assigning of the second virtual IP address to the provided virtual machine, additional mapping information for the virtual computer network that associates multiple virtual IP addresses for the provided virtual computer network with the multiple computing nodes.

15. The computer-implemented method of claim 6 wherein the assigning of the second virtual IP address to the provided virtual machine includes replacing an assignment of the first virtual IP address to the provided virtual machine with a new assignment of the second virtual IP address to the provided virtual machine, and wherein the method further comprises preventing, after the assigning of the second virtual IP address, communications that are directed to the first virtual IP address from being delivered to the provided virtual machine.

16. The computer-implemented method of claim 6 wherein the assigning of the second virtual IP address to the provided virtual machine includes adding a new assignment of the second virtual IP address to the provided virtual machine to supplement an existing assignment of the first virtual IP address to the provided virtual machine, and wherein the method further comprises forwarding to the provided virtual machine, after the assigning of the second virtual IP address, communications that are directed to the first virtual IP address or to the second virtual IP address.

17. The computer-implemented method of claim 6 further comprising:

receiving, by the one or more configured computing systems and while the hosted virtual machine is executing the software, a request to move the provided virtual machine to a new indicated location;

selecting, by the one or more configured computing systems and in response to the request to move the provided virtual machine to the new indicated location, a second virtual machine that is hosted by the online service and is at the new indicated location;

initiating, by the one or more configured computing systems, executing the software on the second virtual machine on behalf of the customer;

assigning, by the one or more configured computing systems, a current virtual IP address for the provided virtual machine to the second virtual machine to enable the second virtual machine to replace the provided virtual machine, wherein the current virtual IP address is the first virtual IP address before the assigning of the second virtual IP address and is the second virtual IP address after the assigning of the second virtual IP address; and forwarding to the second virtual machine, by the one or more configured computing systems after the assigning of the current virtual IP address to the second virtual machine, one or more communications directed to the current virtual IP address.

18. A system, comprising:

one or more hardware processors of one or more computing systems; and one or more memories with stored instructions that, when executed by at least one of the one or more hardware processors, cause the at least one hardware processor to:

provide a virtual machine that is hosted on a host computer system of an online service and is in use by a customer of the online service;

store mapping information on the host computer system to associate a first virtual internet protocol (IP) address with the provided virtual machine;

use the stored mapping information to, while the provided virtual machine is in use by the customer, provide one or more communications to the provided virtual machine;

receive a request to change the first virtual IP address associated with the provided virtual machine;

associate, in response to the request and while the provided virtual machine continues to be in use by the customer, a second virtual IP address with the provided virtual machine on the host computer system;

update the stored mapping information on the host computer system to associate the second virtual IP address with the provided virtual machine; and use the stored updated mapping information to provide one or more additional communications to the provided virtual machine based on the second virtual IP address.

19. The system of claim 18 wherein the stored instructions include software instructions that, when executed, configure the at least one hardware processor to:

receive an initial request from the customer, before the provided virtual machine is in use by the customer, to associate the first virtual IP address with the virtual machine; and provide the customer with access to the virtual machine in response to the initial request.

20. The system of claim 19 wherein the request to change the first virtual IP address is received from the customer and includes an indication of the second virtual IP address, and wherein the software instructions further configure the at least one hardware processor to:

forward, to the provided virtual machine and before the associating of the second virtual IP address with the provided virtual machine, one or more communications that are directed to the first virtual IP address; and forward, to the provided virtual machine and after the associating of the second virtual IP address with the provided virtual machine, one or more additional communications that are directed to the second virtual IP address.

21. The system of claim 20 wherein the received initial request from the customer includes a request to provide a virtual computer network having multiple computing nodes to the customer, and wherein the software instructions further configure the at least one hardware processor to:

select the virtual machine as one of the multiple computing nodes, and select additional virtual machines hosted by the online service for use as other of the multiple computing nodes; and store additional mapping information that associates multiple virtual IP addresses for the provided virtual computer network with the multiple computing nodes.

22. The system of claim 18 wherein the one stored instructions include software instructions that, when executed, configure the at least one hardware processor to:

receive, while the provided virtual machine is executing software for the customer, a request to move the provided virtual machine to a new indicated location;

select, in response to the request to move the provided virtual machine, a second virtual machine that is hosted by the online service and is at the new indicated location;

associate a current virtual IP address for the provided virtual machine with the second virtual machine, to enable the second virtual machine to replace the provided virtual machine; and forward to the second virtual machine, after the associating of the current virtual IP address with the second virtual machine, one or more communications directed to the current virtual IP address.

* * * * *